United States Patent
Jorgenson

(10) Patent No.: US 7,024,451 B2
(45) Date of Patent: Apr. 4, 2006

(54) SYSTEM AND METHOD FOR MAINTAINING CONSISTENT INDEPENDENT SERVER-SIDE STATE AMONG COLLABORATING SERVERS

(75) Inventor: Daniel Scott Jorgenson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 739 days.

(21) Appl. No.: 09/992,099

(22) Filed: Nov. 5, 2001

(65) Prior Publication Data

US 2003/0105805 A1    Jun. 5, 2003

(51) Int. Cl.
*G06F 15/16* (2006.01)
(52) U.S. Cl. ............ 709/203; 709/217; 709/218; 709/219; 709/227; 709/205; 709/248
(58) Field of Classification Search ............ 709/203, 709/217, 218, 219, 227, 205, 248
See application file for complete search history.

(56) References Cited

U.S. PATENT DOCUMENTS

| 5,577,251 | A | * | 11/1996 | Hamilton et al. | 718/101 |
|---|---|---|---|---|---|
| 5,717,570 | A | * | 2/1998 | Kikinis | 361/685 |
| 5,768,528 | A | * | 6/1998 | Stumm | 709/231 |
| 5,787,251 | A | * | 7/1998 | Hamilton et al. | 709/203 |
| 5,809,012 | A | * | 9/1998 | Takase et al. | 370/229 |
| 5,931,905 | A | * | 8/1999 | Hashimoto et al. | 709/217 |
| 5,999,728 | A | * | 12/1999 | Cable | 717/105 |
| 5,999,943 | A | * | 12/1999 | Nori et al. | 707/104.1 |
| 6,012,083 | A | * | 1/2000 | Savitzky et al. | 709/202 |
| 6,182,086 | B1 | * | 1/2001 | Lomet et al. | 707/202 |
| 6,182,139 | B1 | * | 1/2001 | Brendel | 709/226 |
| 6,539,381 | B1 | * | 3/2003 | Prasad et al. | 707/10 |
| 6,549,916 | B1 | * | 4/2003 | Sedlar | 707/200 |
| 6,944,662 | B1 | * | 9/2005 | Devine et al. | 709/225 |

* cited by examiner

*Primary Examiner*—Ario Etienne
*Assistant Examiner*—Emmanuel Coffy

(57) ABSTRACT

A system and method are provided for maintaining consistent server-side state across a pool of collaborating servers with independent state repositories. When a client performs an event on a collaborating server which affects such state on the server, it publishes notification of the event into a queue maintained in client-side state which is shared by all of the collaborating servers in the pool. As the client makes requests to servers within the pool, the queue is thus included in each request. When a collaborating server needs to access its server-side state in question, it first discerns events new to it from the queue and replicates their effects into such server-side state. As a result, the effects of events upon server-side state are replicated asynchronously across the servers in the pool, as the client navigates among them.

25 Claims, 18 Drawing Sheets

SYSTEM AND METHOD FOR MAINTAINING CONSISTENT INDEPENDENT SERVER-SIDE STATE AMONG COLLABORATING SERVERS

BACKGROUND OF THE INVENTION

1. Field of the Invention

The present invention relates generally to network servers and, more particularly, to techniques for maintaining consistent server-side state among collaborating servers with independent state repositories.

2. Discussion of Related Art

The World Wide Web (WWW or Web) is the aggregate of autonomous, heterogeneous, distributed, collaborative, hypermedia information systems existing on the underlying global computer network known as the Internet. Since 1990 the Web has served as the basis for the construction of a multitude of constituent information systems ("Web sites"), providing countless applications in areas ranging from content publishing to electronic commerce.

Current Web sites are implemented with server computers ("Web servers") which are accessed over the Internet by client computers ("Web clients") using the Hypertext Transfer Protocol (HTTP) or its encrypted form (HTTPS). There are many public documents describing various versions, features, and aspects of HTTP. Use of the term "HTTP" herein should be understood to encompass all such versions of HTTP in both its clear and encrypted forms.

A typical interaction between a Web client and a Web server includes several HTTP transactions. For example, when a user of the Web client desires to access a resource on a particular Web site, the user operates Web client software (generally referred to as a "browser") and indicates a Uniform Resource Locator (URL), which specifies the location of the resource on the Web. From the URL, the browser determines the Internet Protocol address of the Web server for the site and establishes communication with the Web server program at that address. The browser then sends an HTTP request message to the Web server program, containing the URL as well as further metadata and parameters concerning the request.

The Web server program, in turn, resolves the request according to the nature of the resource identified by the URL. This process may be as simple as fetching a static file, or as complicated as executing further application logic to dynamically produce a response. In either case, the resolution (called a "Web page") is downloaded, along with further metadata regarding the outcome of the transaction, in an HTTP response message from the Web server program to the browser. The browser interprets the HTTP response and typically renders and displays the page to the user.

In most Web sites, such pages are hypermedia (often authored in Hypertext Markup Language, HTML), including embedded URL's referencing other pages. If the user selects such an embedded LRL (a "hyperlink"), a new HTTP request is formulated and the process repeats. In this way, multiple interactions like these may occur over time to constitute a cohesive experience of the Web site by the user. Such a collection of consecutive, experientially cohesive interactions with a Web site is called a "session".

As is known, the HTTP protocol is inherently "stateless," which means that an HTTP request contains no information about the outcome of a prior request. Therefore, a Web server communicating with a client computer cannot rely on HTTP for maintaining state over a session (i.e., storing information relating to the user's overall interaction with the server, such that the information can automatically be accessed by the server, as needed when handling subsequent user requests within the same session, without further user intervention). Many Web sites are thus faced with the problem of maintaining such "session state" over HTTP, in order to provide a rich, personalized, seamless user experience. There are numerous techniques known in the art which resolve the problem of session state maintenance between a single Web client and server. These include techniques for storing session state information at the Web client (called "client-side session state"), as well as techniques for storing session state information at the Web server with reference from the Web client (called "server-side session state").

In client-side session state solutions, when the server program creates session state information in the process of handling an HTTP request, it provides the data to the browser for retention, as part of the HTTP response. The information is provided by the server program in such a manner that the browser will automatically provide it back to the server program in any subsequent HTTP request(s) whose server processing requires the information. In this way, the client "remembers and reminds" the server of the session state information it needs.

Client-side session state solutions are enabled using various techniques known in the art. Perhaps the most popular example is the use of HTTP cookies. Specifically, when the Web server desires to store state data client-side, it includes a named data element (the "cookie") within the HTTP response for the Web page. This element contains the state data to be retained by the client; it also specifies the scope of the data in terms of its duration, path, and network domain. In turn, the client includes the cookie within each subsequent HTTP request that conforms to that scope, so that the state data can be accessed by the responding server each time from the cookie contained in the request.

Other known techniques for enabling client-side session state include hidden HTML form arguments and URL-embedded arguments (e.g. query strings). With these techniques, the Web page content is created and returned by the server such that certain hyperlinks within it are pre-loaded with the state data the server desires to store, such that the data will be included in the subsequent HTTP request made by the client should the user select the hyperlink. The responding Web server can then obtain the state data from the hidden HTML form argument or URL contained within the request.

Generally, however, the various client-side constructs suffer shortcomings relating to security, size, and/or performance. With regard to security, all of the client-side constructs are open to inspection and modification by nefarious clients, simply due to the fact that the data is exposed to the client for retention and transmission back to the server. With regard to size limitation, most of the client-side constructs are problematic when data to be stored exceeds a few kilobytes. For example, URLs have undefined size limits but in practice many Web clients, servers, and proxies expect them to be no more than one or two kilobytes in size. As another example, it is known that cookies are generally limited to a size of 4K bytes. The number of cookies themselves, and the total size of all cookies retained by a client, have similarly narrow limits. Finally, with regard to performance, the client-side constructs all involve two-way exchange of state information across the Internet, which for large state data especially may entail undesirable delay. These considerations all serve to make client-side session state more suitable for small, non-sensitive state data elements.

As is further known, these shortcomings with client-side session state have made server-side session state solutions attractive to many Web sites. With server-side session state, when the server program creates session state information in the process of handling an HTTP request, it stores the information locally (that is, on the Web server itself or on a companion computer, such as a database server). The information is stored under a unique reference for the particular user's session. This reference (commonly called a "session ID") is what is then exchanged with the browser, per any of the devices enabling of client-side session state solutions. The session state information itself is stored server-side, typically using such interprocess storage devices as a database, file system, or shared memory. Because these devices are not size-limited to the degree the client-side constructs are, scalability shortcomings are overcome. Furthermore, because the state data is retained local to the Web server (or a nearby database server), security and performance issues are similarly avoided vis-a-vis client-side session state. (Only the session ID is retained client-side in server-side state solutions, and because it is a small and typically authenticated piece of data, the issues with client-side state do not pertain to it.)

While the foregoing discussion addresses session state maintenance, it is further recognized in the art that the same problem characterization and solution techniques pertain to maintenance of persistent state data, when seamless continuity in such data is desired within a session, as well as across a same user's multiple sessions as well. In this regard, persistent state data (like session state data) is merely information relating to a user's overall interaction with a Web server and stored so as to allow for automatic access by the server when processing future requests from the same user. But persistent state data (unlike session state data) is desired to endure beyond the termination of a user's session, into the same user's next session. As is known, this is the only essential difference between maintenance of such persistent state and that of session state. Because this is a difference in merely the time-extent of the desired maintenance, the same problem characterization and solution techniques are known to generally pertain to both, and thus the preceding discussion on session state maintenance can be applied to persistent state maintenance as well.

Furthermore, and on this basis, references in this document to "client-side state" and "server-side state" should be understood as referring generally to session and persistent state, in their client-side and server-side forms (respectively), unless otherwise specified. Likewise references in this document to "state" without further qualification or context should be understood as referring generally to all forms of client-side and server-side session and persistent state.

Turning now from the preceding discussion of Web state maintenance, as the number of users increases, a typical Web site may not be able to handle all users' requests using a single server, but rather has to employ a pool of servers to handle user requests. Servers in such a pool are referred to as "collaborating," and a simple example is illustrated in FIG. 1A. Specifically, FIG. 1A illustrates a client 110 and a pool of Web servers 120*n* (where n=A, B, C, . . . ) connected by a computer network 130. In some cases, all of the collaborating Web servers 120*n* provide the same set of services redundantly (where the redundancy is purely for purposes of accommodating large numbers of users). For example, servers 120*n* might all provide a company's online product support services. In other cases, however, it is advantageous to offer servers providing different sets of services to the same users. For example, servers 120A and 120B might redundantly provide a company's online product support services, while server 120C might provide the company's online product catalog, and server 120D might provide the company's online product store.

When a pool of collaborating Web servers is used to comprise a Web site, it is often desired that certain session and/or persistent state data be transparently held in common across the servers in the pool, to varying degrees. For example, the state data to be maintained consistently might comprise all of the state data accumulated over the course of a user session by the collaborating Web servers 120*n* within the pool. But in other cases, just a common subset of the state data might be involved. Indeed, in some of these cases, there might be multiple such subsets, each needing to be shared independently among particular services. To build on the prior example, only servers 120A and 120B (the product support service) and server 120D (the product ordering store) might share product order history data. Only servers 120D and 120C (the online catalog) in turn might share product preference data. And all four servers might share user registration data. Furthermore, depending on how heterogeneous the Web servers and their services are, different data formats might be used internally within each Web server for those state objects which are held in common.

Thus, maintaining one or more state objects consistently across one or more (possibly heterogeneous) Web server collaboration pools becomes necessary to transparently share the appropriate sets of state data among the appropriate Web services. A principle advantage of client-side state is that this requirement generally does not present a problem. With regard to session state, since there is only one client per session (by definition), any of the client-side techniques, which arrange for data to be stored at the client and then automatically transmitted to a Web server as the user navigates, naturally provide for transparent sharing of session state data. And with regard to persistent state, so long as the same client is used across multiple sessions, with a client-side state technique that allows for extension across such multiple sessions (such as HTTP cookies), client-side state naturally provides for transparent sharing of persistent state data, too.

For example, it is known that an HTTP cookie may be set by one particular server 120A in the collaboration pool 120*n* such that its scope is all servers within the pool. Consequently the cookie will be automatically transmitted within each HTTP request made by the client to another server 120D in the pool, which will then be able to access the data stored by 120A accordingly. As is further known, the duration of this behavior can be specified via the expiration timestamp assigned to the cookie, as appropriate for the nature of the data being shared (session-transient or persistent). Accordingly, session state data may be transported in a cookie which is set to expire at the end of the session (or which expiration is defined to mark the end of the session). And persistent state data may be transported in a cookie set to expire well past the end of the session—if ever.

However, the shortcomings of client-side state, and the resulting widespread employment in the art of server-side state, have been noted above. Yet if state is maintained server-side for a particular duration (whether session or persistent), either the client must always connect to the same server for at least that same duration, or server-side state must somehow be shared among all collaborating servers 120*n* in the pool. Specifically, even though the session ID component of a server-side state solution, transported in client-side state, is thus inherently shareable across the pool as noted above, the actual state data referenced by the session ID and retained server-side is not, wherein arises the present problem.

As illustrated in FIG. 1B, some prior art collaborating Web servers employing server-side state address the problem by sharing a single server-side state repository 125 amongst themselves (such as a database server used by multiple collaborating Web servers as the joint repository for their common server-side state, whether session or persistent). Since the problem of maintaining consistent server-side state only appears with multiple Web servers which use independent server-side state repositories, this solution approach side-steps the problem by employing a single repository 125. However, the performance of such systems does not scale well across a wide network area, as the size of the state data grows while the collaboration pool becomes geographically dispersed. (Indeed, the performance shortcoming in this case is reminiscent of that of client-side state, discussed previously.) Additionally, using a common server-side state repository 125 introduces a point-of-failure vulnerability, which in order to be addressed leads to complex failover requirements. Certainly an attraction of independent server-side state repositories is their insulation from failures in other repositories, and hence the insulation of each Web server in the pool from failures of other servers in the pool.

Other prior art collaborating Web servers employing server-side state (e.g., collaborating Web server 120A) may share state data by broadcasting any changes in the state data to all other collaborating Web servers (e.g., collaborating Web servers 120B, 120C and 120D), as shown in FIG. 1C. Thus, unlike in FIG. 1B, each Web server continues to maintain its own independent rendition of server-side state; consistency between them is accomplished by "echoing" updates to all when the client performs an action on one that affects its server-side state. While this approach works satisfactorily when the number of collaborating Web servers is small, it becomes increasingly more impractical in terms of performance when the number of collaborating Web servers and/or the amount of state data shared among the collaborating Web servers grows.

Such a broadcast approach also assumes that the user is certain, or at least likely, to navigate across all collaborating Web servers 120n subsequent to the replication broadcast. The system thus proactively undertakes such replication to each collaborating Web server 120n in the expectation the user will soon navigate to each. Since replication of state to any particular collaborating Web server 120D will, by definition, have been unnecessary unless the user does in fact subsequently navigate to that server 120D, the broadcast approach essentially gambles on future user navigation. However, user navigation across the World Wide Web is inherently unpredictable. If a user declines to navigate to a particular collaborating Web server 120D subsequent to the broadcast, whatever work was undertaken by the system to replicate the state data to that server 120D will have been wasted.

As a result, there is a need for an improved system for maintaining consistent server-side state amongst stateful, independent Web servers that overcomes these limitations.

SUMMARY OF THE INVENTION

The system and method of the present invention overcome the limitations of the prior art discussed above. Specifically, the present invention is directed to a system and method for maintaining consistent server-side state across a pool of collaborating servers with independent state repositories. When a client performs an event on a collaborating server which affects such state on the server, it publishes notification of the event into a queue maintained in client-side state which is shared by all of the collaborating servers in the pool. As the client makes requests to servers within the pool, the queue is thus included in each request. When a collaborating server needs to access its server-side state in question, it first discerns events new to it from the queue and replicates their effects into such server-side state. As a result, the effects of events upon server-side state are replicated asynchronously across the servers in the pool, as the client navigates among them.

Thus state change is only replicated on servers as-needed, reducing the work required to be performed by the system relative to the prior art. Furthermore, such state change is replicated across a system comprised of independent server-side state repositories, so that the known advantages of server-side (vis-a-vis client-side) state and independent (vis-a-vis centralized) state repositories are realized. Note that since the replication is based on the tracking of events which affect state objects, there is less coupling between the collaborating servers than if the state objects themselves were tracked, allowing servers more freedom in determining whether and how to replicate state change.

DETAILED DESCRIPTION OF THE INVENTION

Figure 1A:
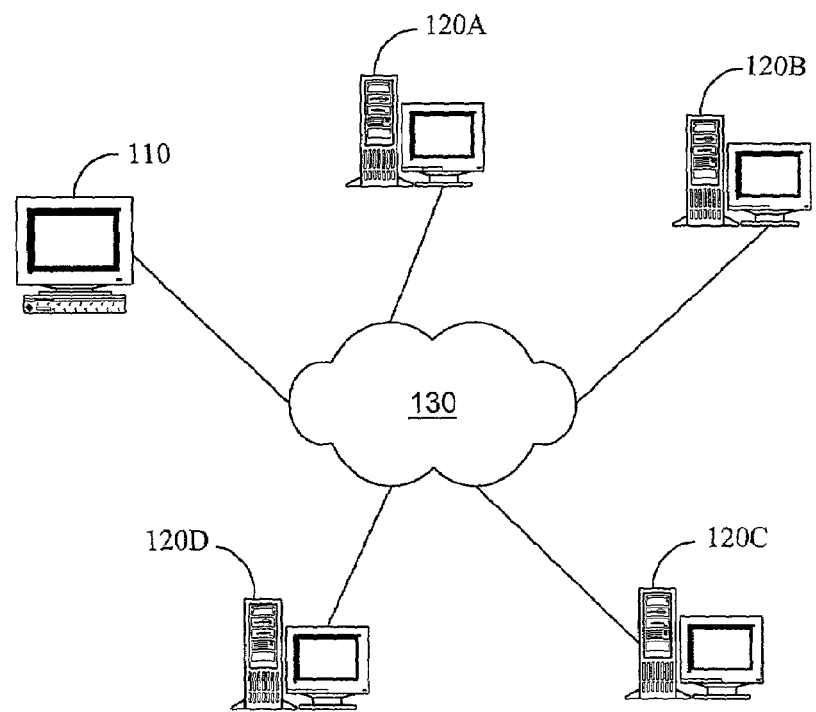
FIG. 1A is a diagram of a prior art system for a Web site comprised of a pool of collaborating Web servers.
Figure 1B:
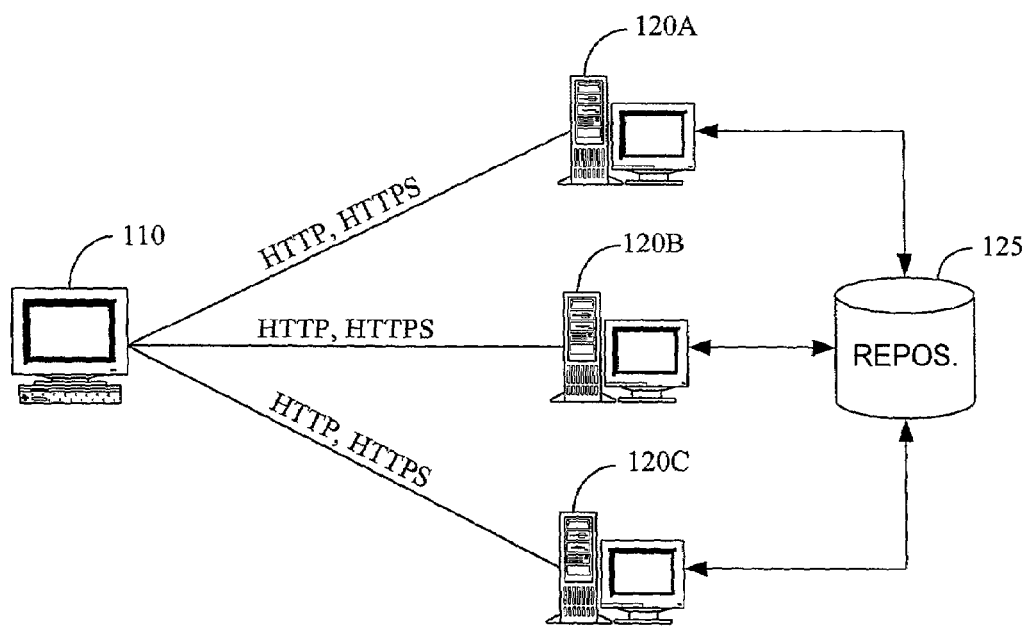
FIG. 1B is a diagram of the prior art system of FIG. 1A, utilizing a common repository for sharing server-side state information.
Figure 1C:
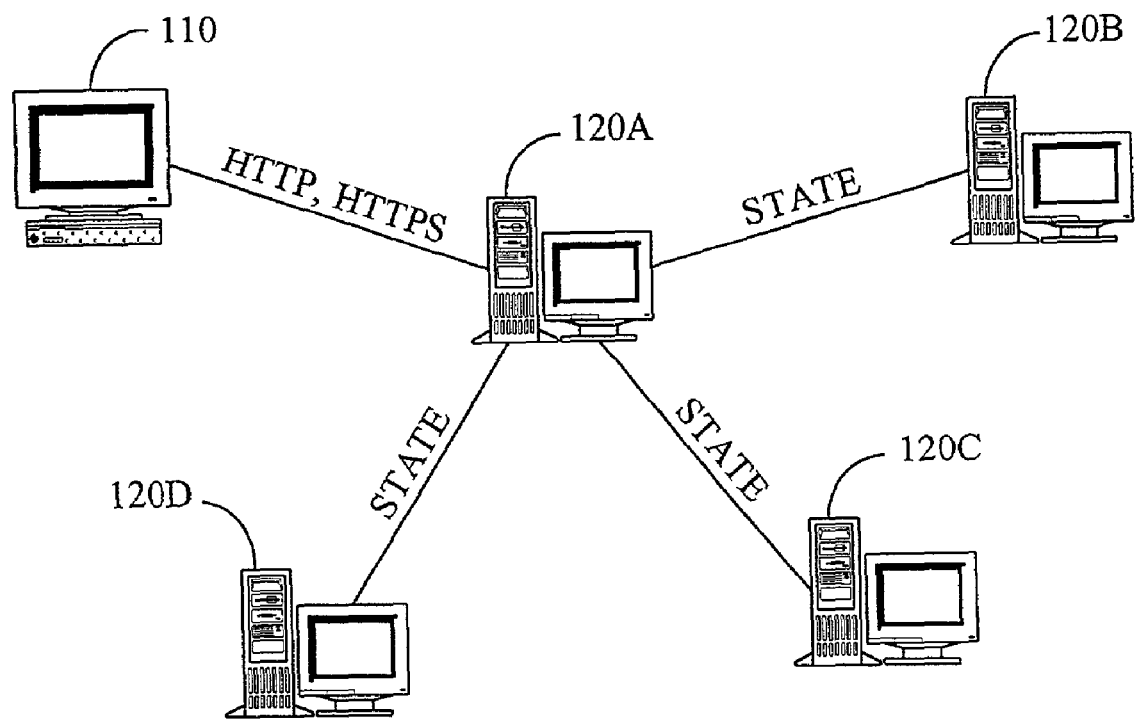
FIG. 1C is a diagram of the prior art system of FIG. 1A, utilizing broadcast replication for sharing server-side state information.

Having summarized various aspects of the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

The system and method of the present invention replicate on an as-needed basis server-side state data among collaborating Web servers which are utilizing independent state repositories. Before discussing the preferred embodiment of the present invention, however, reference is first made to an alternative inventive approach, which is the subject of application Ser. No. 09/710,728, filed Nov. 10, 2000, and assigned to the assignee of the present invention (issued as U.S. Pat. No. 6,845,390, on Jan. 18, 2005). In this alternative inventive approach, the server-side state data to be shared is organized into state objects, where each state object is a unit of state data replicated atomically and independently of the other state objects. With reference to this alternative inventive approach, and for terminology consistency with the co-pending application, a collaborating Web server that writes (creates, modifies, or deletes) a state object is referred to as a "subject," while a collaborating Web server that reads a state object is referred to as an "observer." It should be noted that a same collaborating Web server may be a subject with respect to one state object and an observer with respect to a different state object. Furthermore, in some embodiments, the same collaborating Web server may be a subject with respect to a state object at one point in time and an observer of that same state object at a different point in time.

In the discussion that follows immediately below, FIGS. 2A–2C, 3A–3C, 4A–4C, and 5A–5C refer to the alternative approach of the above-referenced co-pending application. Before describing the alternative approach, several definitions are set out immediately below. To the extent that these terms may have a particular meaning, as a term or art or otherwise, that differs from the definitions set out below, the definitions shall control the interpretation and meaning of the terms as used within the specification and claims herein, unless the specification or claims expressly assigns a differing or more limited meaning to a term in a particular location or for a particular application.

Client refers to any Web client computer and program which supports and accepts any of the known client-side state mechanisms. For example, in many embodiments of the present alternative inventive approach, the client is required to support and accept HTTP cookies.

State Object refers to server-side state data to be replicated atomically between Web servers. It may be transient data (in existence only for the duration of a Web client/server session) or persistent data (in existence across multiple Web client/server sessions). It may be replicated literally, or transformed between different internal representations. The repository for a State Object may be the Web server itself, or a separate database or file server on which the Web server keeps its state data, or both (as in a caching scheme in which the Web server maintains a local cache of state data persisted in the separate database or file server). Finally, the total server-side state of a Web server may consist of multiple State Objects, replicated independently of one another, plus non-replicated state as well.

As an example, one Web server may host an online bookstore. Its total state may consist of a customer information record (name, etc), a bookstore shopping cart, and a history of book purchases. Another Web server may host an online grocery store. Its total state may consist of an identically-structured customer information record, a groceries shopping cart, and a coupon book. The customer information record could be a State Object for replication between the servers.

As another example, consider the book and grocery applications in the previous example. Both may include postal address within the customer information State Object, but they represent customer name differently. The bookstore represents name as "title", "first name", "middle name", and "last name". The grocery store represents name as just a single field. But even though the customer information structures are not literally identical in this example, because there is a heuristic for transforming mechanically from one representation to the other, the customer information still qualifies as a replicatable State Object.

As yet another example, consider the book and grocery applications again, with a third Web server hosting an online greeting card application. Its total state consists of customer name and list of card recipients. The name could be one State Object A for replication between all 3 servers. The remainder of the customer information record (consisting of the email address, postal address, etc) could be another State Object B for replication just between the book and grocery applications.

Collaborating Web Server refers to any Web server computer and program that desires to replicate one or more server-side State Objects with one or more other collaborating Web servers. Collaborating Web servers do not have to be hosting the same applications; they just need to have at least one State Object in common (literally or via transformation). However, for purposes of the present alternative inventive approach, collaborating Web servers do employ independent state repositories for their State Objects.

As an example, consider the book, grocery, and greeting card Web servers of the previous example. Assume they are all collaborating Web servers to varying degrees. The book and grocery servers are collaborating Web servers for State Objects A and B. The greeting card server is just a collaborating Web server for State Object A.

Collaboration Pool refers to all of the collaborating Web servers for a State Object. In many embodiments of the present invention, where HTTP cookies are used, all servers in a Collaboration Pool share a common network domain (this is necessary for the cookie signal to work).

As an example, the book, grocery, and greeting card servers in the previous example have DNS names all ending in ".etail.com". They form a Collaboration Pool.

Subject refers to any collaborating Web server which performs write operations (initialize, modify, delete) to its local copy of the State Object. That is, for State Object X, each collaborating Web server which writes to its own local copy of X is a Subject for X. A collaborating Web server may have many State Objects it is replicating, in which case it is Subject or Observer (or both) for each State Object independently.

Observer refers to any collaborating Web server which reads its local copy of the State Object. That is, for State Object X, each collaborating Web server which reads its own local copy of X is an Observer of X. A collaborating Web server may have many State Objects it is replicating, in which case it is Subject or Observer (or both) for each State Object independently.

As an example, consider the book, grocery, and greeting card Web servers described in the previous examples. Each of them reads the customer name (State Object A), and each of them writes to it as well. Thus all are Subjects and Observers for A, the customer name State Object. Conversely, only the book and grocery servers read the remainder of the customer information State Object B, and only the book server writes it. Thus the book server is a Subject and Observer for B, the grocery server is just an Observer for B, and the greeting card server is neither.

Figure 2A:
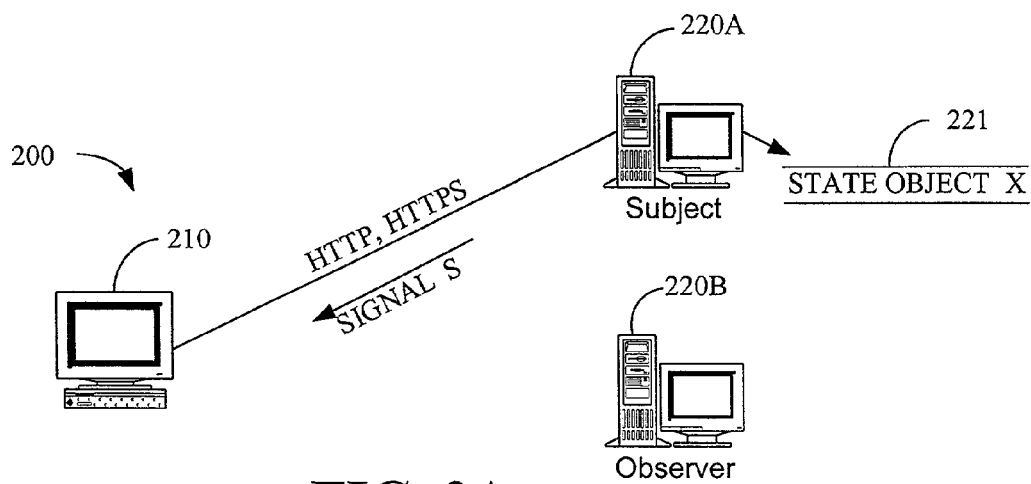
FIGS. 2A–2C are diagrams illustrating the connections among collaborating Web servers, in accordance with one inventive approach.
Figure 2B:
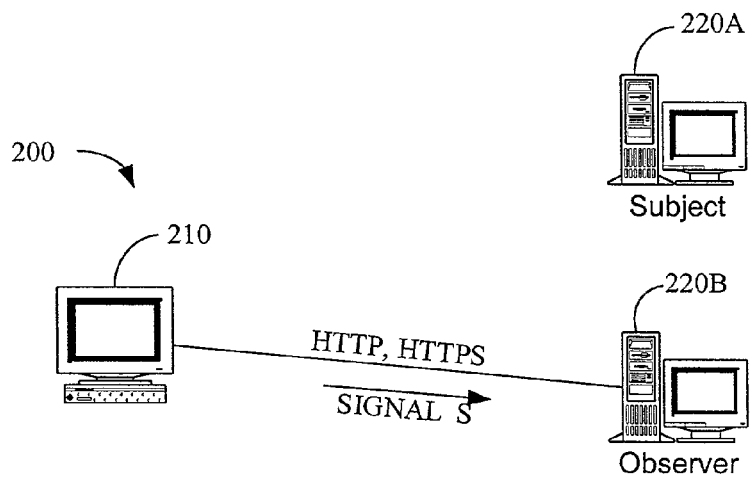
Figure 2C:
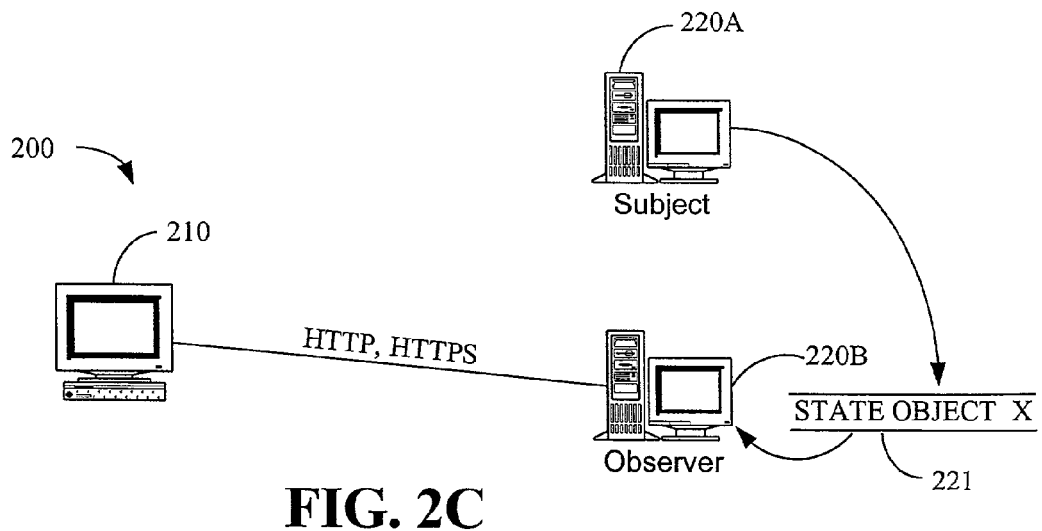

FIGS. 2A–2C illustrate a state replication system 200, in accordance with some embodiments of the present alternative inventive approach. The figures illustrate a Web client 210 performing HTTP/HTTPS transactions against a collaboration pool comprising collaborating Web servers 220A and 220B. These collaborating Web servers each use independent, Web-server-resident state repositories for maintenance of their server-side state. Note the collaboration pool may contain any number of collaborating Web servers; the figures limit themselves to two merely because such is sufficient to illustrate the present alternative inventive approach.

Initially (FIG. 2A), client 210 establishes an HTTP/HTTPS connection to collaborating Web server 220A which results in a write to a server-side state object X 221. In other words, collaborating Web server 220A is a subject with respect to state object X 221. The response from subject server 220A to client 210 includes a signal S, uniquely identifying this instance of state change to X on subject server 220A as the latest such instance among all collaborating Web servers. Signal S is transported in such a way that client 210 loads it into client-side state for the collaborating Web servers 220n. In many embodiments of the invention, signal S takes the form of an HTTP cookie whose domain is set such that it is sharable among all the collaborating Web servers 220n.

At a later time (FIG. 2B) client 210 establishes a connection with collaborating Web server 220B, which requires collaborating Web server 220B to read server-side state object X. In other words, collaborating Web server 220B is an observer of state object X. Note that collaborating servers 220A and 220B employ independent state repositories, so that the value of state object X within observer server 220B's repository is now inconsistent with the value established on subject server 220A (FIG. 2A). Note also that the request from client 210 to observer server 220B (FIG. 2B) includes the prior signal S. Since the signal S indicates that subject server 220A has modified state object X 221, before observer server 220B can respond to client 210's request, observer server 220B must replicate the modified version of state object X 221 from subject server A (FIG. 2C). Observer server 220B also must make note of signal S, so as not to needlessly repeat the replication in the future. Once the copy of state object X 221 has been replicated on observer server 220B, observer server 220B can handle client 210's request. If, in responding to client 210's request collaborating Web server 220B modifies state object X 221, collaborating Web server 220B becomes the subject and collaborating Web server 220A becomes the observer.

Figure 3A:
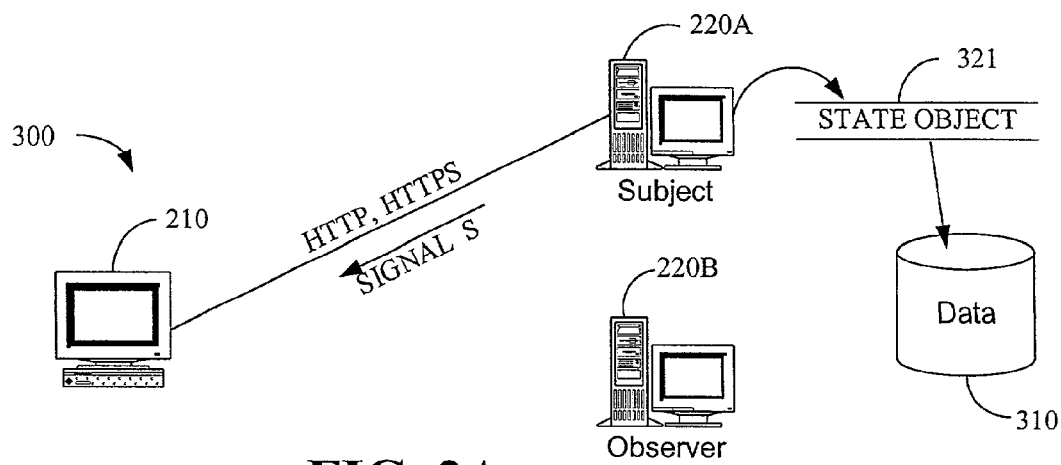
FIGS. 3A–3C are diagrams illustrating the connections among collaborating Web servers and a central database in accordance with one inventive approach.
Figure 3B:
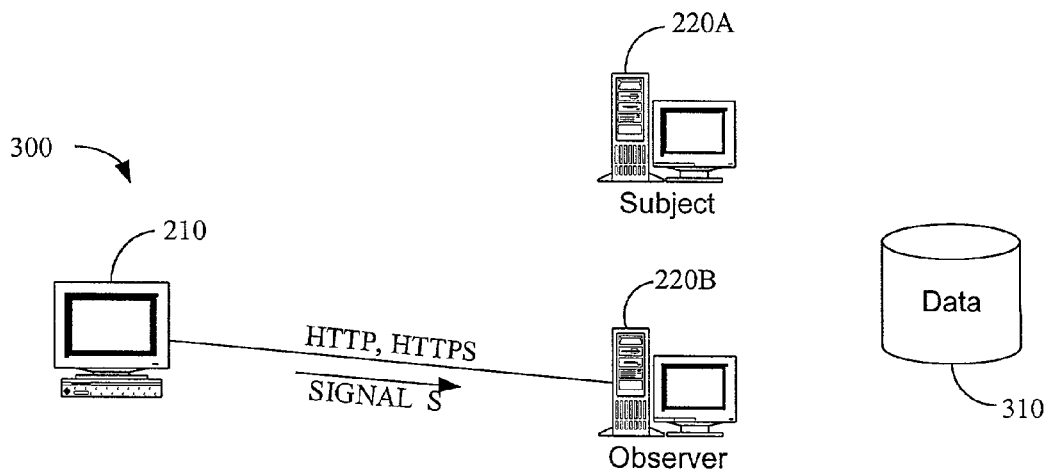
Figure 3C:
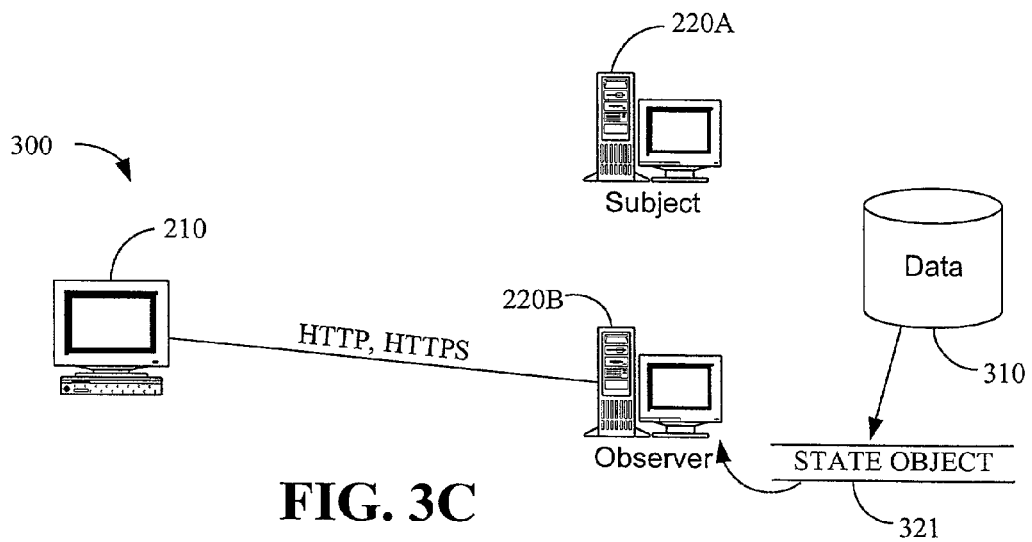

FIGS. 3A–3C illustrate a state replication system 300, in accordance with some embodiments of the present alternative inventive approach. State replication system 300 is similar to state replication system 200 (FIGS. 2A–2C) except that a central database 310 is used to store state objects which are cached in the collaborating Web servers. Thus a collaborating Web server normally refers to its cache when reading state data. When a subject collaborating Web server 220A modifies a state object 321, the state object 321 is written through the cache of 220A to be stored in database 310 (FIG. 3A). Similarly, when an observer collaborating Web server 220B needs to read the state object 321 following such a modification, the state object is retrieved through the cache from database 310, backfilling the cache as a side-effect.

Figure 4A:
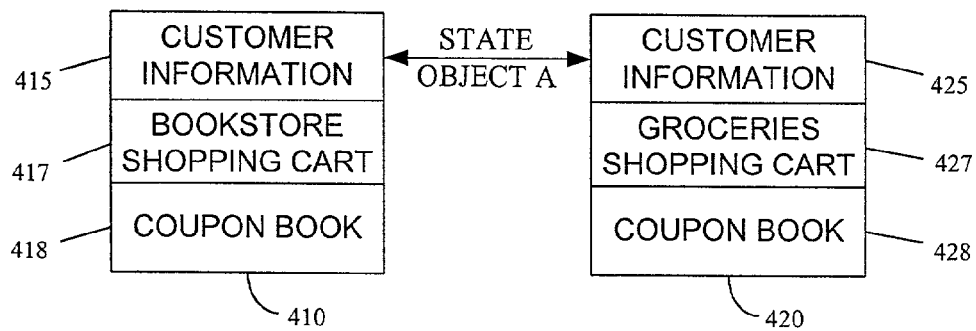
FIG. 4A is a block diagram illustrating a state object A shared between collaborating Web servers.

FIG. 4A is a block diagram illustrating the state data used by collaborating Web servers 410 and 420, in accordance with some embodiments of the present alternative inventive approach. In the exemplary embodiment of FIG. 4A, collaborating Web server 410 maintains a bookstore Web site, while collaborating Web server 420 maintains a grocery store's Web site. The server-side state of collaborating Web server 410 includes customer information 415, bookstore shopping cart 412 and coupon book 418. Similarly, the server-side state of collaborating Web server 420 includes customer information 425, groceries shopping cart 422 and coupon book 428. Since both states include customer information data, such state information can be shared using a state object A. As a result, when a customer updates his/her information on either collaborating Web server 410 or 420, the information is automatically shared with the other server, without requiring the customer to reenter the information. Note that other server-side state data, such as the shopping carts and coupon books which are unique to either collaborating Web server 410 or 420, is not shared.

Figure 4B:
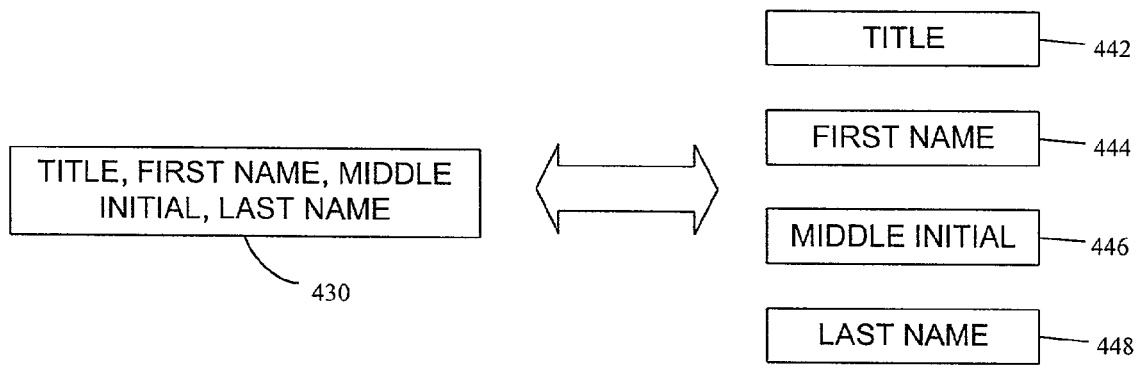
FIG. 4B is a block diagram illustrating alternative formats of a state object.
Figure 4C:
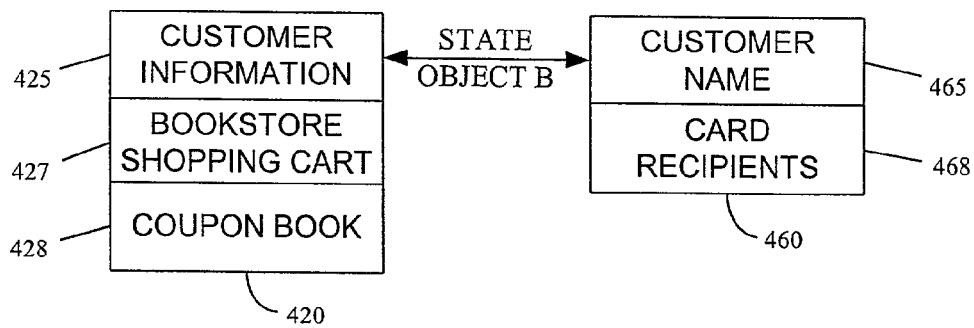
FIG. 4C is a block diagram illustrating a state object B shared between collaborating Web servers.

A state object can also be used to share server-side state data that is formatted differently across collaborating Web servers employing the present alternative inventive approach, as long as a mapping function is provided. For example, FIG. 4B illustrates a customer name object 430 that can be easily mapped into a title object 442, a first name object 444, a middle name object 446 and a last name object 448. When customer name object 430 is shared with a collaborating Web server using title object 442, first name object 444, middle name object 446 and last name object 448, a mapping function (e.g., concatenation or substring) is used to translate the object into the required format.

Finally, in some embodiments a portion of a state object may be shared with another collaborating Web server. For instance, in the exemplary embodiment of FIG. 4C, state object B is shared between collaborating Web servers 420 and 460. The server-side state of collaborating Web server 420 includes customer information 425, groceries shopping cart 422 and coupon book 428, while the server-side state of collaborating Web server 460 includes customer name 465 and card recipients 468. Collaborating Web server 420, as explained above, maintains a grocery store Web site, while collaborating Web server 460 maintains an electronic postcard Web site. State object B is used to share a portion of customer information 425 with customer name 465. As in the case of FIG. 4B, an appropriate mapping function is used to translate the shared information into the appropriate format. Thus, one skilled in the art will appreciate that state object definitions, for purposes of replication, do not have to align with state types internal to the collaborating servers, but may be arbitrarily defined so as to facilitate replication of whatever data is required.

Figure 5A:
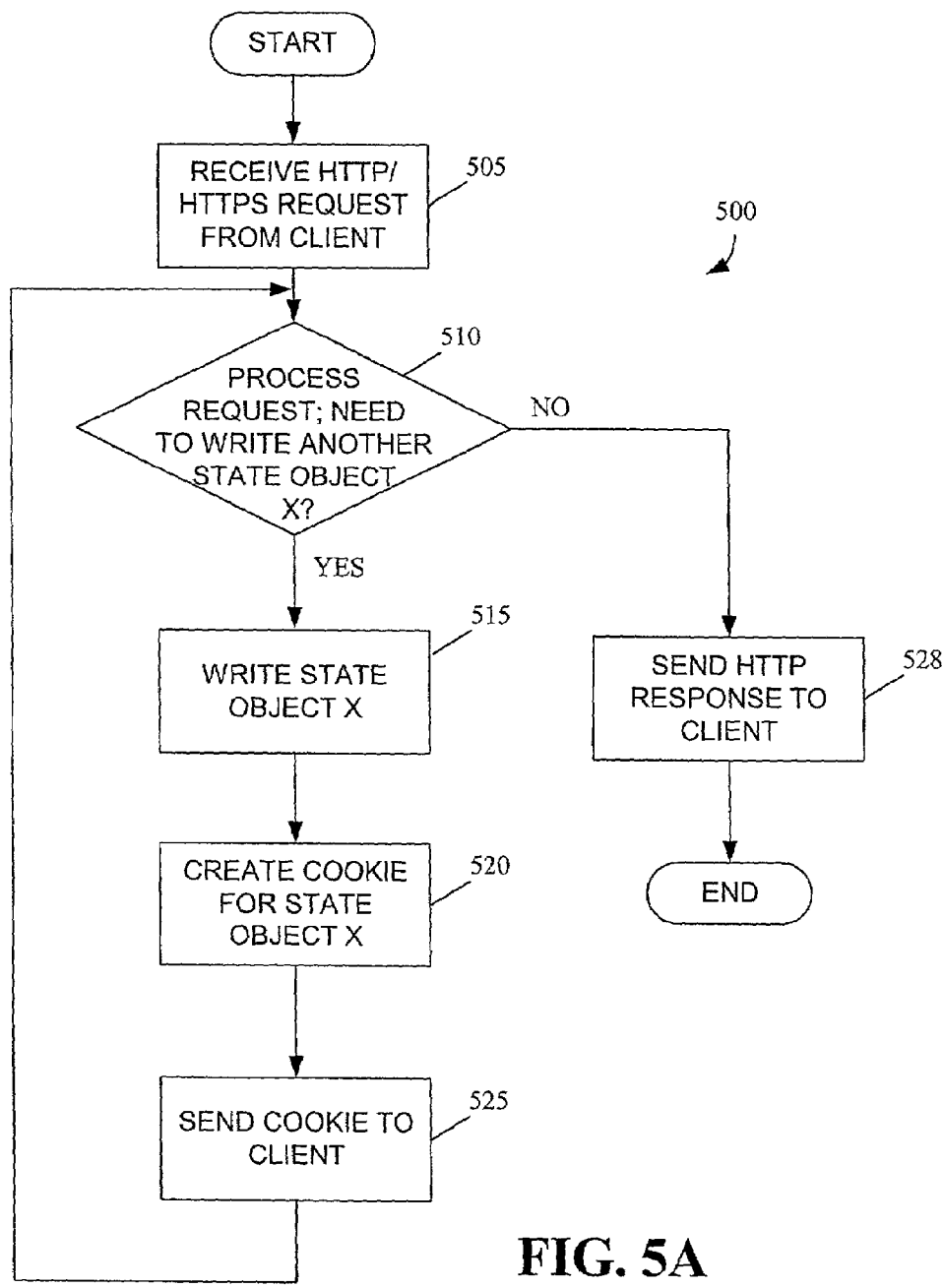
FIG. 5A is a flow diagram of the top-level operation of a subject collaborating Web server, in accordance with one inventive approach.

FIG. 5A is a flow diagram of the operation 500 of a subject collaborating Web server, in accordance with some embodiments of the present alternative inventive approach. Initially, collaborating Web server 220n receives an HTTP/HTTPS request from a client 210 (stage 505). In the context of processing the request in the usual manner known in the art, stage 510 then determines whether the request requires creation, modification, or deletion of a state object X (collectively referred to as "writes" to the state object X). Here X refers to a particular server-side state object being shared by the subject server with one or more observer servers, all with independent state repositories, as in FIGS. 2A–2C or FIGS. 3A–3C. There may be more than one such state object X, in which case each is considered in turn as needed in the processing of the request.

If, for a particular state object X, a write needs to occur, operation 500 proceeds to stage 515. In stage 515, collaborating Web server 220n writes (creates, modifies, or deletes) the state object X. In those embodiments described in FIGS. 2A–2C, this entails writing to a local copy of X on the subject server 220n. In those embodiments described by FIGS. 3A–3C, however, this entails additionally writing to a copy of X on a remote database server 310.

In stage 520 an HTTP cookie 530 (FIG. 5B) is created to alert other collaborating Web servers 220n that the state object X has been modified by the particular subject server 220n currently executing operation 500. Cookie 530 is then sent to requesting client computer 210 (stage 525) and operation 500 proceeds back to stage 510, where writes to other state objects are considered and handled similarly. In this way, multiple state objects may be written and signaled to prospective observer servers 220n independently.

When all appropriate state objects have been considered, operation 500 proceeds to stage 528. At this stage, the HTTP response to client 210 is completed (for example, an HTML page is constructed and sent to client 210) and operation 500 terminates.

Figure 5B:
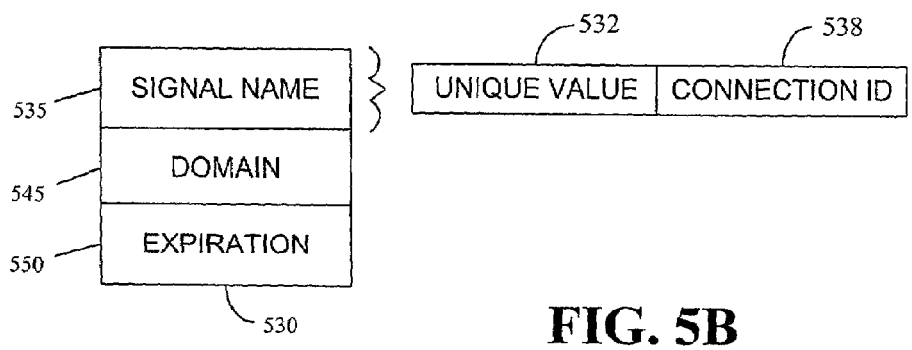
FIG. 5B is a block diagram illustrating components of an HTTP cookie, in accordance with one inventive approach.

FIG. 5B is a block diagram illustrating the structure of HTTP cookie 530 created in stage 520 (FIG. 5A), in accordance to some embodiments of the present alternative inventive approach. Cookie 530 serves to signal a state change to a particular state object X on a particular subject server 220n. Specifically, it includes a signal name 535, a domain 545 and an expiration 550. Signal name 535, in turn, includes a unique value 532 and a connection ID 538.

Signal name 535 is used to identify the server-side state object X which has changed, and is used as the cookie name.

Domain 545 specifies the domain for which the cookie has been created. Per the HTTP cookie specification (Internet RFC 2965), it is important that the domain be expansive enough to encompass all of the collaborating Web servers 220n. Otherwise, the signal will not propagate properly to all of the observer servers. In turn, this also requires that the names of collaborating Web servers 220n all share a common network domain.

Expiration 550 specifies an optional (i.e., the expiration could be null) expiration time for the cookie, and hence the signal. Note therefore that the expiration time should correspond to the nature (session-transient or persistent) of the state object X. Specifically, if state object X is session state data, then signal S should be set to expire at the end of the session (or alternatively the expiration of S may be allowed to define the end of the session with respect to X). Conversely, if state object X is persistent state data, then signal S should be set to expire well after the end of the session, if ever.

Unique value 532 is any value which, once generated, will never be repeated (for all practical purposes). For example, in some embodiments a timestamp or large pseudorandom number is used. Unique value 532 serves to uniquely identify the particular instance of the signal. Each instance of a change to state object X across the collaboration pool will have a different unique value 532.

Connection ID 538 is the information necessary to identify and connect to an authoritative source and retrieve the state object associated with the cookie. In those embodiments described by FIGS. 2A–2C, connection ID 538 identifies the subject server 220n and its connection information (e.g., DNS name or IP address, port number, session ID, and state object ID). In those embodiments described by FIGS. 3A–3C, connection ID 538 identifies the subject server 220n as the originator of the state change, and (in some embodiments) provides connection information for common database server 310 (in other embodiments, this information is invariant and so does not need inclusion in connection ID 538). In any case, the exact content of connection ID 538 may vary from one embodiment to another, as different remote method invocation protocols are used to perform the state object retrieval in different implementations. Connection ID 538, as represented in the present invention, should be understood to encompass all such possible specific contents.

Note that in the illustrated embodiment there is a one-to-one mapping between cookie name and signal name. In embodiments with many state objects, a single cookie, with a global cookie name, may instead be used. In such cases, the global cookie value is set equal to a catenation of all the signal name, unique value, and connection ID tuples for all the state objects. Stage 520 of operation 500 would then selectively update only the particular tuple associated with the current state object X, leaving the remainder of the cookie contents (i.e., the remaining tuples associated with other state objects) effectively unchanged.

Figure 5C:
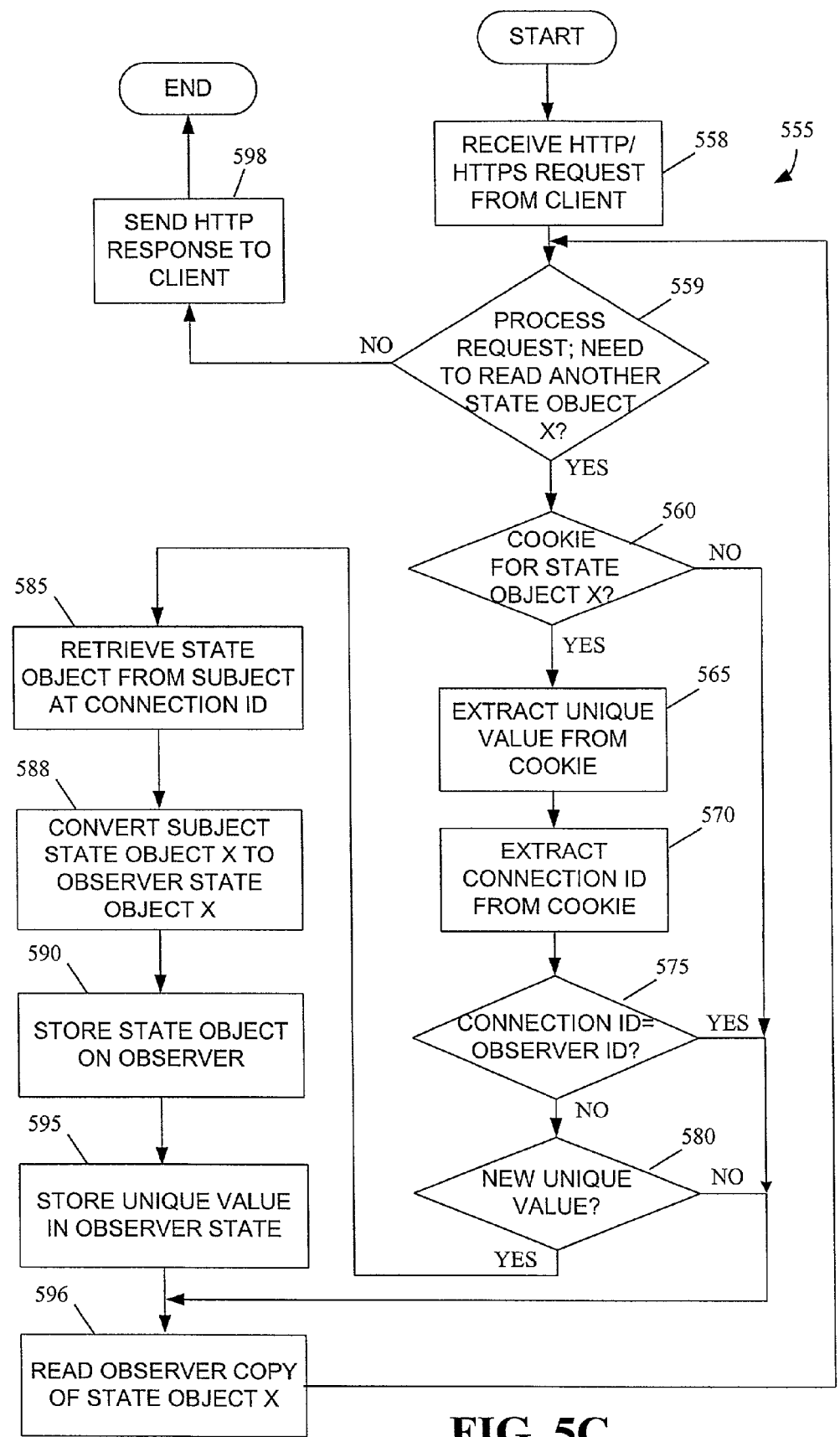
FIG. 5C is a flow diagram of the top-level operation of an observer collaborating Web server, in accordance with one inventive approach.

FIG. 5C is a flow diagram of the operation 555 of an observer collaborating Web server, in accordance with some embodiments of the present alternative inventive approach. Initially, collaborating Web server 220n receives an HTTP/HTTPS request from client 210 (stage 558). In the context of processing the request in the usual manner known in the art, stage 559 then determines whether the request requires reading state object X from the server's state repository during operation 555. Here X is a particular server-side state object being shared among some or all collaborating Web servers 220n, all with independent server-side state repositories. There may be more than one such state object X, in which case each will be considered in turn as needed in the processing of the request. If, for a particular state object X, a read needs to occur, operation 555 proceeds to stage 560. Stage 560 determines whether there is an HTTP cookie associated with state object X present in the client request. As shown in FIG. 5B, this cookie 530 serves to alert observer servers 220n of a change to state object X having occurred on a particular subject server. If no such cookie 530 exists, this means there is no update to state object X awaiting replication to the observer server 220n, so operation 555 proceeds to read the local copy of state object X (stage 596). If the cookie 530 does exist, however, its unique value 532 and connection ID 538 are then extracted (stages 565 and 570, respectively).

Stage 575 then determines whether connection ID 538 identifies the same observer collaborating Web server 220n as is currently executing operation 555. Such occasion means that the update to X which is being signaled by the cookie actually originated with this same collaborating Web server 220n (which at the time was acting in the capacity of subject to state object X). In that case, of course, no replication is necessary, so operation 555 proceeds to read the local copy of state object X (stage 596). Otherwise, it is indicated that the update to X originated on a different collaborating Web server 220n, in which case operation 555 proceeds to stage 580.

Stage 580 then determines whether the unique value 532 is already stored in the state of observer server 220n. Such occasion means that the update to X being signaled by the cookie has already been replicated onto this observer server 220n, so operation 555 proceeds to read the local copy of state object X (stage 596). Otherwise, a new update to X, needing replication onto this observer server 220n, is indicated. Operation 555 then proceeds to stage 585.

Stages 585 through 595 perform the tasks associated with replicating the state object X onto the observer server 220n. First, the state object is retrieved from the authoritative source specified by connection ID 538 (stage 585). Specifically, in those embodiments described by FIGS. 2A–2C, subject server 220n is the authoritative source. In these cases, connection ID 538 provides connection information for subject server 220n (e.g., DNS name or IP address, port number, session ID, and state object ID). This information allows observer server 220n to retrieve the new value for state object X from subject server 220n at stage 585. Alternatively, in those embodiments described by FIGS. 3A–3C, common database server 310 is the authoritative source. In these cases, connection ID 538 includes (in some embodiments) connection information for database server 310 (in other embodiments, that information is invariant and so does not need to be included in connection ID 538). At stage 585, the observer server 220n thus retrieves the new value for state object X from the database server 310 accordingly. In any case, observer server 220n uses an appropriate client interface to perform the retrieval from an appropriate state-retrieval server object operating on the authoritative source. A variety of different application-layer protocols could be used in various embodiments to perform this retrieval, built upon a number of different remote method invocation protocols (such as Java RMI, SOAP, DCE, etc). Likewise, a variety of application client interfaces and server objects could communicate using any of the protocols to accomplish the retrieval of state object X at stage 585. Thus the present invention is not limited to any particular technique for performing the retrieval at stage 585.

The retrieved state object X, having come from a remote authoritative source, is then converted into the preferred representation for that state object on the observer server 220n (stage 588). For example, stage 588 would perform the conversion between formats shown in FIG. 4B. In embodiments in which there are no differences in representation of state object X among collaborating Web servers 220n, stage 588 simply performs no work.

The state object X, now converted (if necessary) into the preferred representation for the observer server 220n, is then stored to local server-side state for observer server 220n (stage 590), replacing whatever previous value for state object X the observer server 220n may have had therein. Likewise, unique value 532 is added to the state of observer server 220n (stage 595) to ensure that cookie 530 would not cause the state object to be needlessly copied from the subject server 220n to the observer server 220n again in the future. Such state for unique value 532 may be stored server-side, either locally on the observer server 220n (as in FIGS. 2A–2C) or remotely on a database server accessible to it (as in FIGS. 3A–3C); or it may even be stored in client-side state. State object X is now replicated, and so operation 555 may proceed to read the newly-updated local copy of state object X at stage 596.

Operation 555 proceeds back to stage 559, where reads from other state objects are considered and handled similarly. In this way, multiple state objects may be replicated and read from various subject servers 220n independently. When all appropriate state objects have been considered, operation 555 proceeds to stage 598. At this stage, the HTTP response to client 210 is completed (for example, an HTML page is constructed and sent to client 210) and operation 555 terminates.

Note that other embodiments of the present alternative inventive approach may forego the use of HTTP cookies altogether for transport of the signal information (name 535, unique value 532, and connection ID 538). In general, any client-side state mechanism supported by Web client 210 and characterized by mutual accessibility throughout collaboration pool 220n may be used. In such embodiments, subject Web server operation (FIG. 5A) would generally be as described above, except stages 520 and 525 would arrange for the signal information for state object X to be created according to the chosen client-side state mechanism. Similarly, observer Web server operation (FIG. 5C) would generally be as described above, except stages 560, 565, and 570 would arrange for the signal information for state object X to be retrieved according to the chosen client-side state mechanism.

The following is a pseudo-code listing of computer programs for one embodiment of the present alternative inventive approach. They may be executed by subject and observer collaborating Web servers described above.

Subject Server Algorithm

The following algorithm is implemented as a server-side component (for example, as a library routine or class method used by a server API plugin, servlet, CGI or FastCGI program) on Subject machines for a given State Object X.

The algorithm is executed by the Subject when an HTTP or HTTPS request is received which causes the server to (possibly among other things) write its local copy of State Object X. Writing consists of initializing, modifying, or deleting. The algorithm is executed immediately after writing X. Conversely, this algorithm is bypassed for all other requests.

```
/* SUBJECT ALGORITHM: Perform this whenever State Object X is
written. */
UniqueValueX = Some value unique to this instance write of X, eg:
    clocktime or large random number
SubjectConnIDX = Connection info for retrieving X from this Subject's
    state repository, eg: DNS name or IP address, port number,
    session ID, and state object ID
SignalValueX = UniqueValueX + SubjectConnIDX
SignalNameX = The cookie name of the signal for X
SignalDomainX = The common network domain for the Collaboration
    Pool for X
SignalExpiresX = The desired expiration time for the signal for X, if any
```

-continued

```
Emit HTTP Response Header:
    Set-Cookie:  SignalNameX=SignalValueX;
                 Domain=SignalDomainX;
                 Expires=SignalExpiresX
/* Done. Return from this component and resume handling the request. */
```

Observer Server Algorithm

The following algorithm is implemented as a server-side component on Observer machines for a given State Object X.

The algorithm is executed by the Observer when an HTTP or HTTPS request is received which causes the server to desire to read from its local copy of State Object X. The algorithm is initiated before the first such read per request; subsequent reads in the same request do not need to execute the algorithm. This algorithm is bypassed for all other types of requests.

```
/* OBSERVER ALGORITHM: Perform this before reading State
Object X for the first time in this request. */
SignalNameX = The cookie name of the signal for X
IF (Cookie named SignalNameX exists) {
/* A signal cookie for X is defined. Get and test its value. */
    UniqueValueX = Read from the SignalNameX cookie value
    SubjectConnIDX = Read from the SignalNameX cookie value
    IF (SubjectConnIDX IS NOT this server's SubjectConnID AND
            /* Prevents Observer from replicating changes from
                itself as Subject */
        UniqueValueX IS NOT in Observer state) {
            /* Prevents an Observer from replicating changes it
                already knows about */
            /* State Object X has changed on a remote Subject. Retrieve the
    new copy of X from the Subject, convert it to the local format as needed,
    and store it and the new Unique Value locally. */
            New SubjectStateObjectX =
                Retrieve from SubjectIDX using agreed-upon RPC
                mechanism with parameters taken from SubjectConnIDX
                /* Implementation varies */
            New ObserverStateObjectX =
                Convert from SubjectStateObjectX as needed
                /* Implementation varies */
            Store ObserverStateObjectX to Observer state
                /* Overwrite prior copy of X */
            Store UniqueValueX to Observer state
                /* For use next time */
    }
}
/* Done. Return from this component and resume handling the request. */
```

Embodiments described above illustrate, but do not limit the described aspects of the present invention. In particular, the invention is not limited by any particular hardware/software implementation. Other hardware/software configurations known in the art can be used in place of those described herein. Further, the stages of process 500 and 555 can be performed in an arbitrary order, unless otherwise indicated in the description above. Other embodiments and variations are within the scope of the invention.

Having described one alternative inventive approach to maintaining consistent server-side state across a pool of collaborating Web servers (where such approach is the subject of application Ser. No. 09/710,728, filed Nov. 10, 2000—issued as U.S. Pat. No. 6,845,390, on Jan. 18, 2005), reference is now made to the preferred inventive approach of the present invention. In this regard, the above-described alternative approach may be summarized as operating by decomposing state that is to be kept in common into state objects. Then, through HTTP cookies (or other appropriate client-side state mechanisms), signals are propagated which track when each of the state objects has been updated on subject servers, allowing observer servers to copy the new state objects into place. When aware that a change has been made to a state object, the server(s) may evaluate the new state object to ascertain "what" change has been made. While this approach effectively synchronizes server-side state information, additional information may be desired, particularly on more complex or robust systems.

In this regard, the preferred inventive approach of the present invention tracks information as to "why" state has changed. As will be described in more detail below, the preferred inventive approach utilizes a mechanism referred to herein as an "event queue" to trace (or track) relevant client-triggered events that impact state objects to be synchronized within the server-side state. The contents of this event queue thus contain direct information as to why state has changed (i.e., what events have occurred remotely which have caused such state change). What has in fact changed can then be determined by replicating those events locally. Thus, the preferred inventive approach allows for maintenance of consistent server-side state throughout the collaboration pool, as with the above-described alternative approach, but does so via a level of abstraction (event tracking rather than state-change tracking) which provides collaborating Web servers more information about user activities.

Figure 6A:
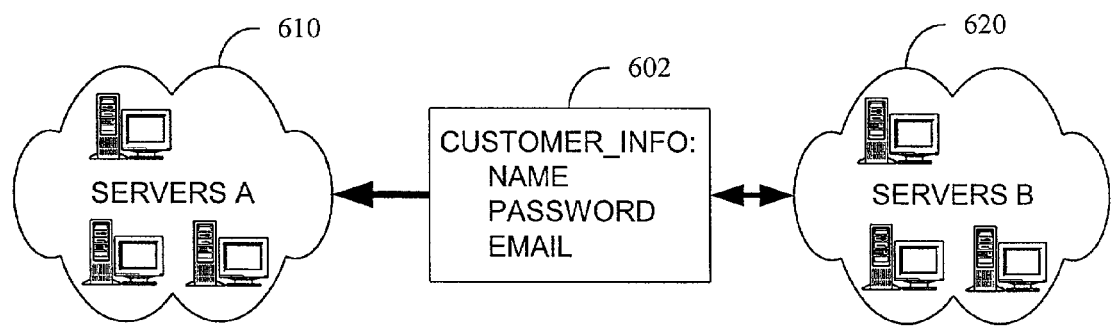
FIGS. 6A–6D are diagrams illustrating a problematic evolution of a system, in accordance with one inventive approach.

In contrast with the above-described alternative inventive approach, the additional information provided by the preferred inventive approach can be beneficial in more complex systems where whether or not state change should be replicated depends on what caused the change, or where requirements for what needs to be replicated evolve frequently. For example, and with reference to FIG. 6A, consider a collaboration pool comprising two sets of servers. One set of collaborating servers A 610 wishes only to track whether or not the user is logged-in over the course of a session. The other set of collaborating servers B 620 additionally wishes to track the user's information (name, password, and email address) over the course of a session when the user is logged-in. Only server set B provides the Web pages actually letting the user login, register, update user information, and logout.

To address this scenario in accordance with the above-described alternative approach, a compound session state object 602 for customer_info (containing name, password, and email) could be defined on servers A 610 and servers B 620 for replication amongst themselves, with servers B 620 in the subject role and both A servers 610 and B servers 620 in the observer role. As subjects, each server B 610 would create local customer_info session state 602 at the time of login or registration; update it at the time of user information modification; and delete it at the time of logout. As observers, each server in set B 620 would replicate all change (creation, modification, or deletion) to customer_info from peer servers B 620, per the above-described alternative inventive approach. This is fine, since it is required, as stipulated for the present scenario, that all servers within set B 620 be able to track all information about the user. However, servers in set A 610, acting as observers of customer_info 620 on servers in B 620, would likewise necessarily replicate all change (creation, modification, or deletion) to customer_info 602 from servers B 620, per the above-described alternative inventive approach—even though servers A 610 would only need to use customer_info 602 to the extent that its presence or absence would be an indicator of whether or not the user is logged-in.

This illustrates a potential shortcoming with the alternative inventive approach applied as described above to this scenario. Specifically, servers A 610 would only care to replicate the customer_info 602 from servers B 620 when the state change on servers B 620 triggering the replication is either creation of customer_info 602 (i.e., by the user logging-in or registering at one of the servers B 620), or deletion thereof (i.e., by the user logging-out at one of the servers B). Should the user change his or her customer_info 602 using an update-name or update-password Web page at one of the servers B 620, servers A 610 would not be interested in undertaking the work to replicate the customer_info in that case (although certainly other servers B 620 would). But such unnecessary replication to servers A 610 could not be avoided, in this application of the above-described alternative approach.

Figure 6B:
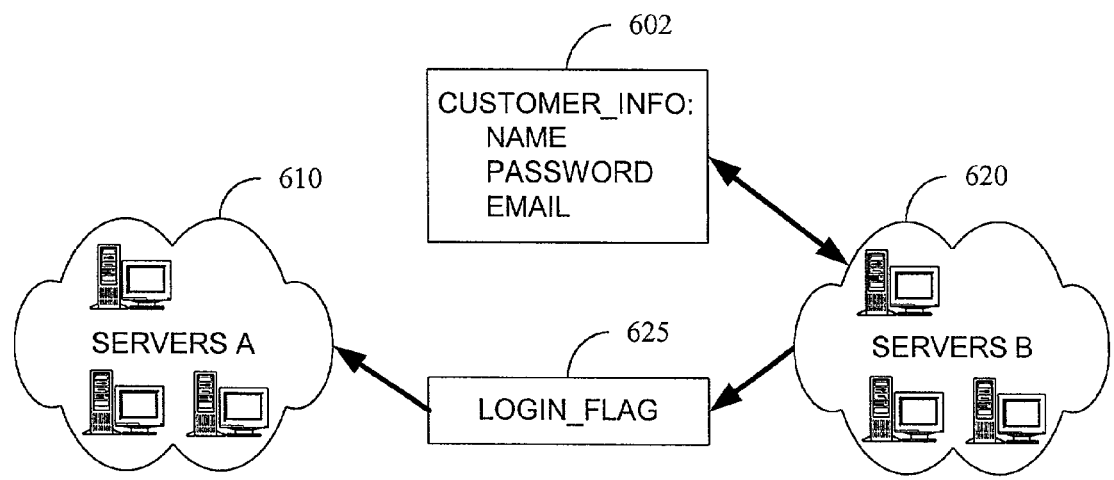

To be sure, workarounds could be applied consistent with the spirit of the alternative approach to address this scenario. For example, instead of one state object (customer_info 602) and its signal, two could be defined (customer_info 602 and login_flag 625) with their own respective signals. This is illustrated conceptually in FIG. 6B. Customer_info 602 would only be replicated within the set of servers B 620. Login_flag 625 would be globally replicated throughout the collaboration pool: servers B 620 acting as the subject and setting the login_flag 625 at the time of login, registration, or logout, while servers A 610 act as observers of the login_flag 625 to replicate login_flag 625 state changes from B servers 620 to A servers 610. But this is an artificial workaround designed strictly for the present scenario. Specifically, servers B 620 have no need themselves for a login_flag 625 per se, as for their purposes they can always use the presence or absence of customer_info 602 to distinguish whether the user is logged-in or not. Login_flag 625—its state object and corresponding signal—would thus be an artifice added to servers B 620 merely to support efficient replication to servers A 610.

Figure 6C:
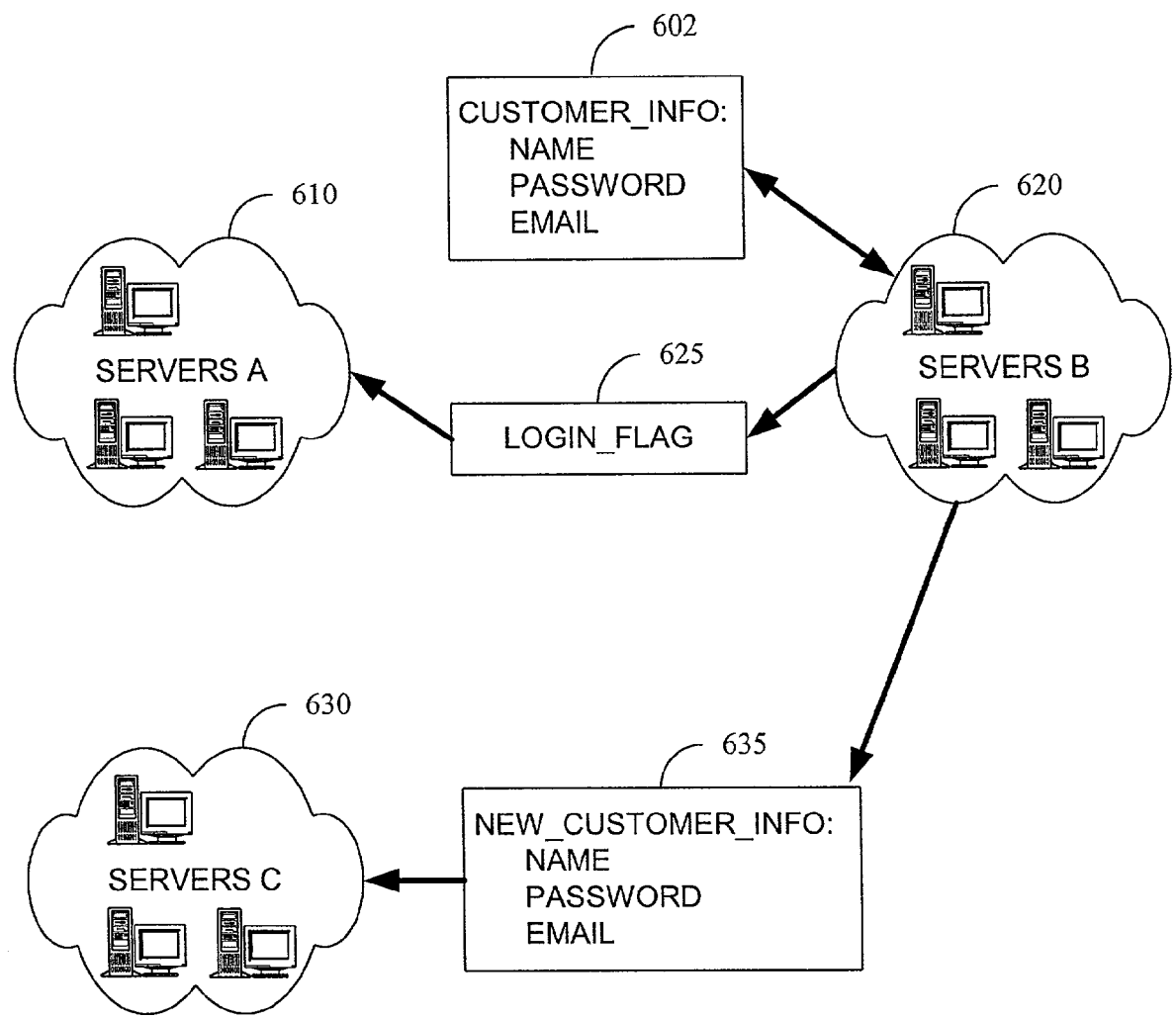

It should further be appreciated that, as the collaboration pool changes over time in response to new system requirements, state objects and their signals must sometimes be artificially re-defined across the pool, forcing changes on some or all of the existing servers in the pool merely to accommodate the new requirements. This applies, for instance, if there is a third set of servers C 630 eventually added to the collaboration pool of the foregoing example, where servers C 630 are interested only in replicating the customer_info 602 when it has been created subsequent to a user registration. (Such an example could be the case when servers C 630 maintain their own customer database which needs seeding from any registration actions performed by server set B 620.) This is illustrated conceptually in FIG. 6C. To accommodate this requirement for the new servers C 630 within the spirit of the alternative approach, a new_customer_info state object 635 and corresponding signal would need to be defined on all servers B 620, with the same format as the customer_info object 602, except that it would only be populated after registration (not login or any other event). Thus servers B 620 would all have to change for no purpose other than to accommodate the new servers C 630.

Figure 6D:
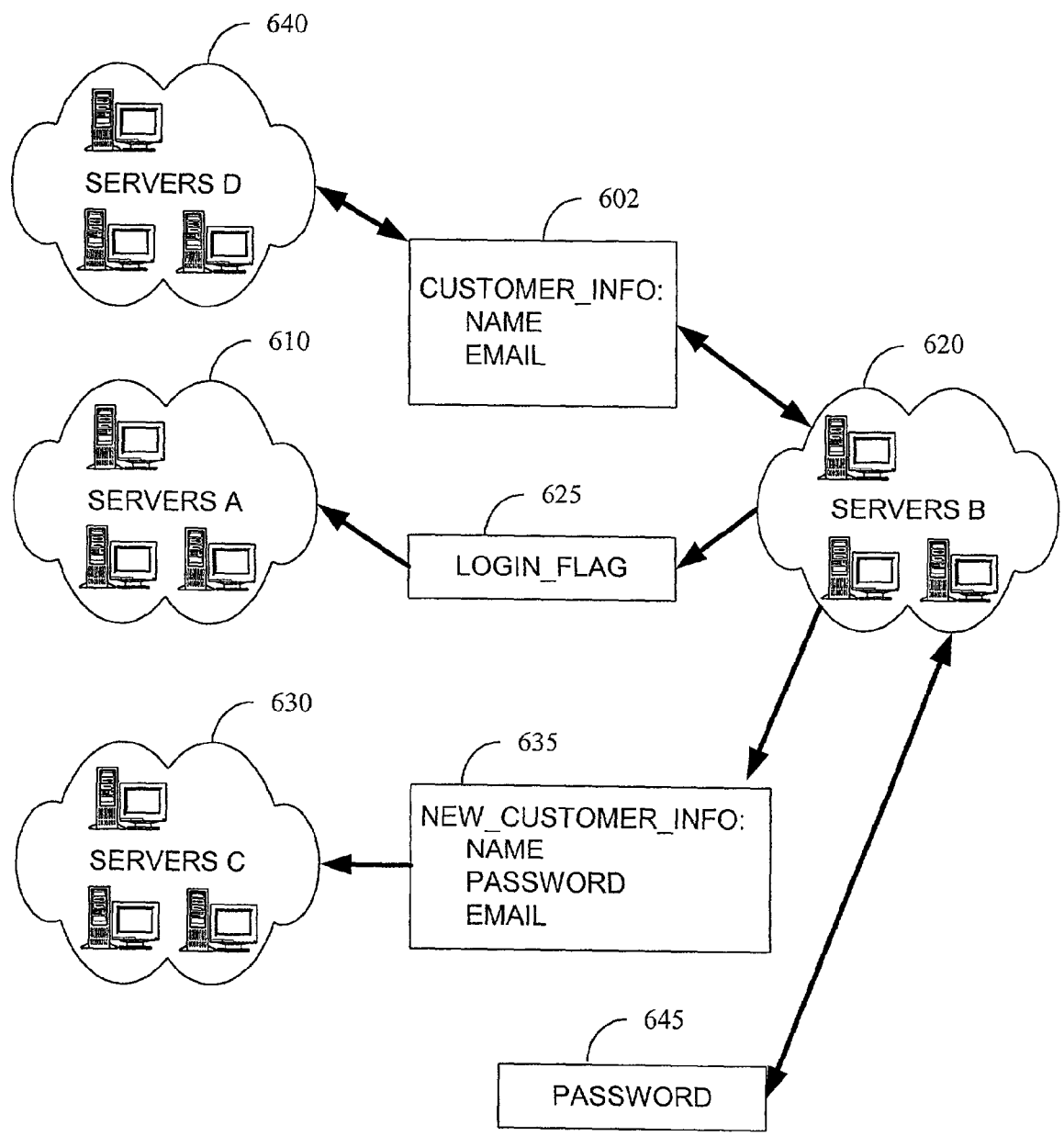

Now consider what would happen if a fourth set of servers D 640 is next added to the collaboration pool, where server set D 640 is like server set B 620, except that it is interested only in the name and email address, but not the password portion of the customer_info 602. Server set B 620 now would be obliged to redefine state objects again, such that the password is split out from the customer_info 602. This is illustrated conceptually in FIG. 6D. Server set B 620 would remain observer of both password 645 and customer_info 602, and subject thereof on all occasions (login, registration, user information modification, and logout). The new server set D 640 would play the role of subject and observer for customer_info 602 only. Again server set B 620 may have had to change for no purpose other than to accommodate the new servers D 640.

Thus, at each stage in the evolution of the collaboration pool in these examples, state objects on existing server set(s) within the pool must be artificially redefined to accommodate the originally-unforeseen requirements of the new server sets. After several such stages, the resulting replication topology is quite complicated. Thus the previously-described alternative approach of the aforementioned co-pending application, while useful in more-stable environments, poses a change-management risk in more-complex and frequently-changing environments.

In contrast, the preferred inventive approach dispenses with state object definitions altogether. Instead, user-interaction events are defined and signalled across the pool. The key advantage to this approach arises from the fact that user-interaction events tend to be more uniform and standard across heterogeneous Web server applications than internal state object definitions. After all, most if not all complex Web server applications recognize and share a common conceptual understanding of an event "login" (which initiates an authenticated session); an event "registration" (which both initiates an authenticated session and creates permanent user information); an event "logout" (which terminates an authenticated session); and so forth. This common and stable understanding of events derives from the fact that they directly reflect user interaction, for which the paradigms are relatively consistent across the Web (at least relative to the internal state definitions of the servers and applications implemented on the Web, which are very heterogeneous).

Thus, to repeat the previous example but using the preferred inventive approach, events would be defined corresponding to each of the user functions supported by the Web servers in the collaboration pool at any given time. Note the example stipulates (not unrealistically, given the above-noted relative consistency and stability in user interaction paradigms) that server set B includes functions to login, register, update information (including name, password, and email address), and logout from the inception. Thus an event for each such function would be definable at the inception of the pool. Because the future scenarios stay bounded within the basic Web user-interaction paradigm, no comprehensive change in the event definitions is then needed to address the evolving requirements of server sets A 610 and B 620, then C 630, then D 640. Thus, to address those evolving requirements, less (or even no) rework on existing servers sets is necessary at each stage.

Figure 7A:
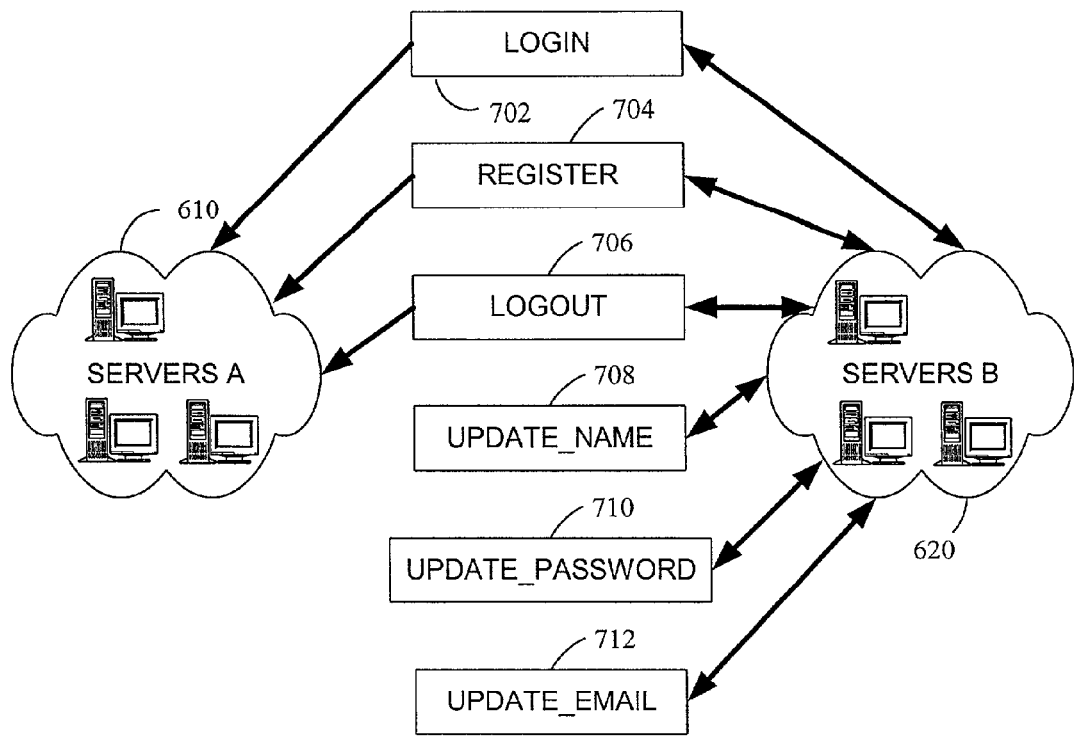
FIGS. 7A–7C are diagrams illustrating an improved evolution of a system, in accordance with a preferred embodiment of the invention.
Figure 7B:
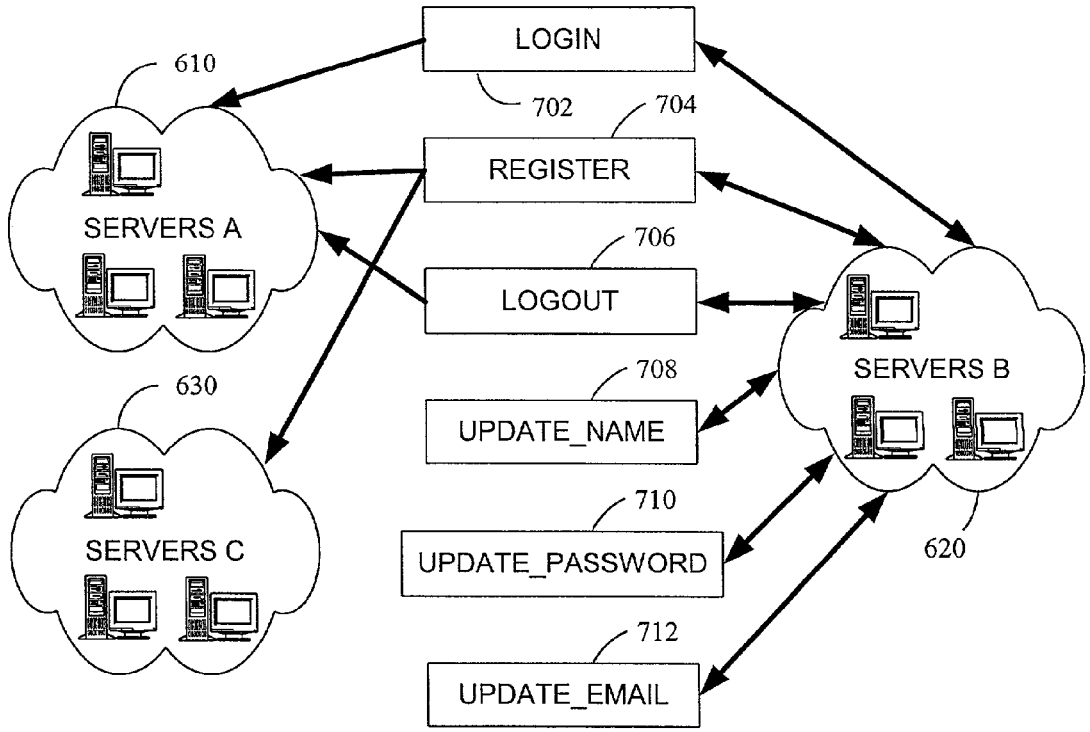
Figure 7C:
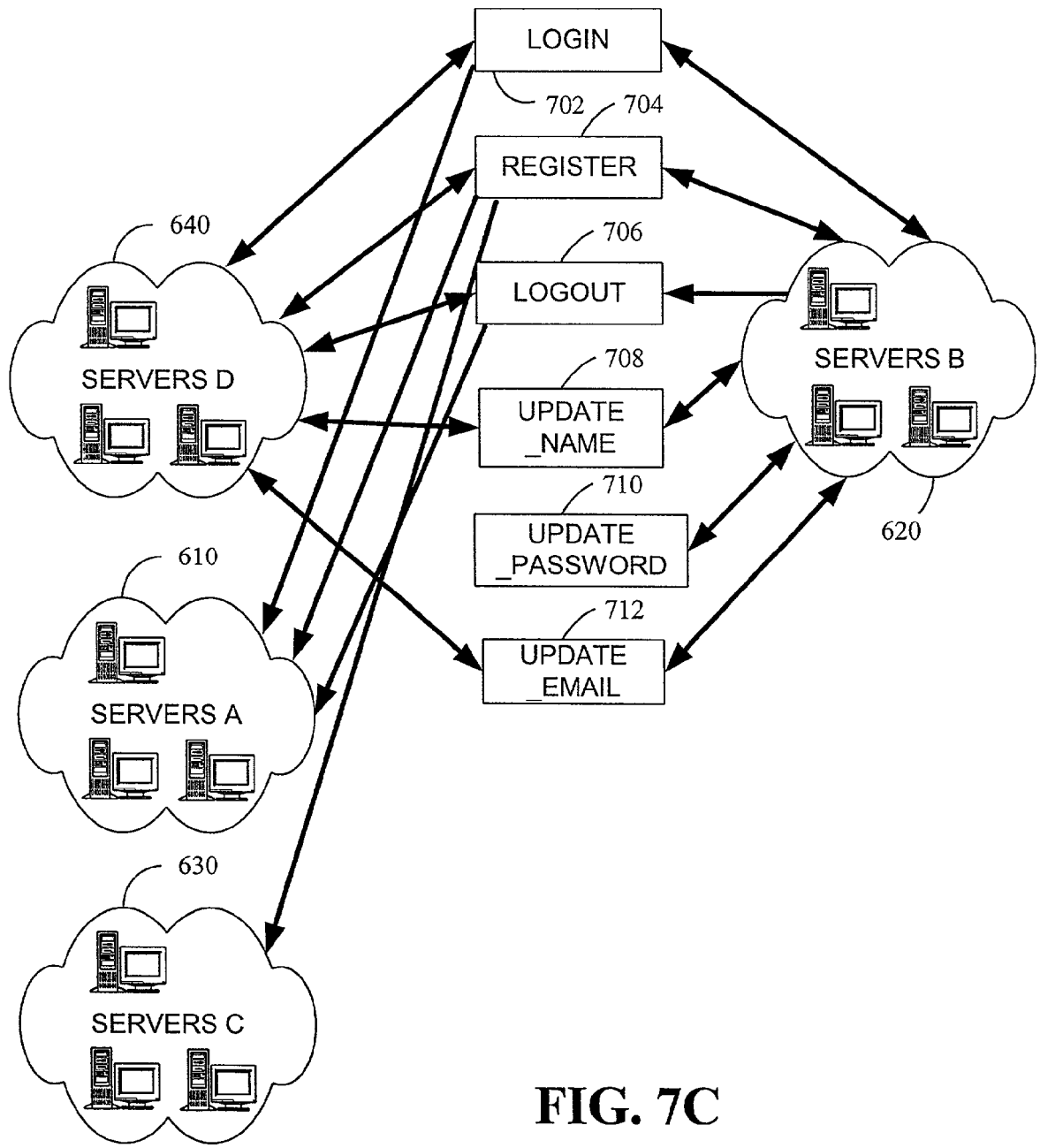

Specifically, the events "login" 702, "register" 704, "logout" 706, "update-name" 708, "update-password" 710, and "update-email" 712 would be definable from the inception. This is illustrated conceptually in FIG. 7A. Servers B 620, where the user-interacted functions for these events are stipulated to reside in the example, would be the signalers (i.e., the "publishers") of these events. Servers A 610 would only monitor signals for, and replicate, "login" 702, "register" 704, and "logout" 706 events, as servers A 610 are stipulated to be uninterested in customer information. (Servers A 610 would thus be "subscribers" to these events.) Servers B 620 would monitor signals for, and replicate, all events. (Servers B 620 would thus be "subscribers" to all events.) If and when server set C 630 arrived in the pool, it would subscribe to only the "register" event (illustrated conceptually in FIG. 7B). Likewise, when server set D 640 arrived, it would subscribe to (and publish) all events besides "update-password", as illustrated conceptually in FIG. 7C. Notice that at each stage of evolution of the collaboration pool, each new server set can be absorbed without impact to any of the existing servers, by subscribing to the subset of events of interest to it. In other words, because the fundamental user interactions are stable from the beginning, there is an adequate set of events defined from the beginning, such that the subsequent additions of servers C 630 and servers D 640 can be absorbed without impact to servers B 620.

Of course, this is an idealized example, and the alternative inventive approach has merit in simpler systems. Likewise, the preferred inventive approach is not guaranteed to insulate legacy servers from change, because new distinctions between different kinds of user interaction, meaning new event definitions not foreseen initially, cannot be ruled out. However, relative to the alternative inventive approach, the preferred approach is likely to be more stable over time, due to its emphasis on tracking more stable and homogeneous aspects of the system (user interaction events versus internal state definitions).

Before discussing the preferred inventive approach of the present invention, reference is first made to additional definitions, which are set forth immediately below. In this regard, it is noted that the terms "publisher" and "subscriber" have been used to generally replace the use of the term "subject" and "observer," which were used in describing the alternative approach above. It should be appreciated, however, that these terms have similar definitions.

Event refers to a Client-triggered activity on a Web server which affects server-side state data that is to be replicated between Web servers. "Client-triggered" means the activity is tied to the action of the Client (user) only, so passive system-triggered activities (e.g., background timeout) do not qualify as Events. The affected data may be session-transient (i.e., in existence only for the duration of the Web client/server session) or persistent (in existence across multiple Web client/server sessions undertaken over time by the same user). The repository for the affected data is server-side and not client-side (e.g., a cookie); however, the server-side repository may be the Web server itself, or a separate database or file server used by the Web server.

As an example, user login is an activity which initializes information concerning the user and his/her session within server-side session state. It is desired that when the user logs-in on one Web server, the login be replicated to other Web servers within the same collaboration pool to which the user subsequently navigates. Login therefore qualifies as an Event for replication.

As a second example, user logout is an activity which finalizes/frees information concerning the user's session within server-side session state. It is desired that when the user logs-out on one Web server, the logout be replicated to other Web servers within the same collaboration pool to which the user subsequently navigates. Logout therefore qualifies as a second kind of Event for replication.

As a third example, email address modification is an activity which updates information concerning the user within server-side state (session and/or persistent). It is desired that when the user modifies his or her email address on one Web server, the new email address be replicated to other Web servers within the same collaboration pool to which the user subsequently navigates. Email address modification is therefore a third kind of Event.

Event Descriptor refers to a record of information concerning a particular occurrence of a particular kind of Event. An Event Descriptor minimally indicates the Event type and its sequence relative to other Event Descriptors in the Event Queue (see below). The sequence may be explicit, via a sequence number, or implied via the Event Descriptor's position within a sorted Event Queue. An Event Descriptor may also provide one or more arguments describing the particular occurrence, where such arguments are anticipated to be potentially helpful to a Subscriber (see below) in replicating the effects of the Event upon server-side state.

As an example, a login Event Descriptor may include an indicator of the type of Event (login) and a sequence relative to other Event Descriptors accumulated in the Event Queue during the session. For example, initially the sequence would be 1 (either an explicit attribute of the Descriptor, or the position of the Descriptor within a Queue maintained sorted). A login Event Descriptor may also include an argument: for example, the user ID of the user. Many Web sites employ databases for persisting user information across sessions. Subscribers could use the user ID argument from a login Event Descriptor to automatically retrieve the user information of interest from such a database for load into Subscriber session state, as if the user were in fact logging-in again at the Subscriber server. Alternatively, the login Event Descriptor argument in a different embodiment might contain connection information sufficient for the Subscriber server to retrieve the user information from the Publisher server (as in the earlier-discussed alternative inventive approach). In yet a third embodiment, the login Event Descriptor argument might include the user information of interest directly, for the Subscriber to load into state.

As a second example, an email address modification Event Descriptor would contain an indicator of the type of Event (email address modification) and a sequence: for example, 2 (assuming the previous login example came first). It may also include an argument: for example, the new email address. Subscribers could take this argument and overlay the current email address within Subscriber state with its value. Alternatively, the email address modification Event Descriptor argument in a different embodiment might go unused, and Subscribers would automatically refresh the email address from the common user information database instead (if applicable). In yet a third embodiment, Subscriber servers might retrieve the new email address from the Publisher server based on connection information (as in the aforementioned alternative inventive approach) contained in the email address modification Event Descriptor argument.

As a third example, a logout Event Descriptor may include an indicator of the type of Event (logout) and its sequence: for example, 3 (assuming the previous login and email-address-modification examples came first). It probably would not contain any argument, since the effect of a logout upon session state in many embodiments is simply to erase state, rather than add or update it with particular data that must be retrieved from some source.

Event Queue refers to a unique list of one or more Event Descriptors accumulated over the course of a series of Web client/server transactions. If the server-side state to be replicated is session-transient, then the Event Queue itself only need be session-transient. Otherwise, if the server-side state to be replicated is persistent, then the Event Queue must likewise be persistent across successive sessions of the same client. The Event Queue is shared by all Collaborating Servers within a Collaboration Pool (see below) via the use of any client-side state technique known in the art which satisfies these requirements. In the preferred embodiment, the client-side state mechanism for such transport of the Event Queue is HTTP cookies.

Note the Event Queue may be maintained sorted, so the ordering of Event Descriptors is implicit in their position within the Queue. Or it may be unsorted, so the ordering of Event Descriptors is made explicit by sequence numbers within each Event Descriptor. Note also that provision is made within an Event Queue to ensure its uniqueness. For example, in some embodiments an Event Queue is headed by a unique value, such as a timestamp or pseudorandom number. Thus each Event Queue, and by extension the Event Descriptors within it, can be uniquely distinguished from all others.

As an example, in the above Event Descriptor examples, the Event Queue ultimately contained 3 Event Descriptors: login (1), email address modification (2), and logout (3). To ensure the Descriptors' uniqueness, in this example the Event Queue further includes a leading pseudorandom number.

Collaborating Server refers to a Web server which desires to replicate one or more Events with one or more other Collaborating Servers. For purposes of the present invention, all such collaborating Web servers employ independent state repositories for their server-side state. For any given Event type, a Collaborating Server is either a Publisher, or a Subscriber, or both.

As an example, the Web servers in the Event examples above are all Collaborating Servers in varying capacities.

Collaboration Pool refers to all of the Collaborating Servers with independent server-side state repositories that are desired to participate in replication and thus share the same Event Queue. In a Collaboration Pool, each Collaborating Server publishes, and/or subscribes to, at least one Event type that is held in common, via the Event Queue, with another Collaborating Server(s) in the same Pool. Collaborating Servers within a Collaboration Pool need not all subscribe to the same set of Events. Nor need all Collaborating Servers within a Collaboration Pool publish the same set of events. Indeed, Collaborating Servers within a Collaboration Pool need not host the same Web applications at all. Because in the preferred embodiment HTTP cookies are used for transmission of the Event Queue, all Collaborating Servers within the Collaboration Pool must occupy a common network domain for the preferred embodiment to be operative.

As an example, the Collaborating Servers in the Event examples above all have DNS names ending in "hp.com" and share the same Event Queue. They form a Collaboration Pool.

Publisher refers to any Collaborating Server which hosts an original Event instance and thus needs to ensure its replication to other server(s) in the Pool (i.e., Subscribers). The Publisher accomplishes this by writing notification of the Event instance, in the form of an Event Descriptor, into the common Event Queue. A Publisher may also be a Subscriber, for the same or different set of Events.

Subscriber refers to a Collaborating Server which seeks to replicate an original Event instance hosted by a remote Publisher in the same Pool. The Subscriber accomplishes this by detecting any new Event Descriptors within the Event Queue (i.e., any Event Descriptors present in the Event Queue at any given time which were not previously detected) and then processing the ones it recognizes. Such processing seeks to duplicate the effect of the original Event instance on the Publisher into the Subscriber server-side state. Such processing may be further optimized by optimization heuristics, used by the Subscriber to determine whether certain newly-detected Event Descriptors may be conditionally overruled by others occurring earlier or later in sequence.

A Subscriber may also be a Publisher, for the same or different set of Events. Example of a simple embodiment of this inventive approach: Assume the Event Descriptors in the Event Queue example above are all published by system1.hp.com as the user interacts there. The user then makes a request of system2.hp.com, a Subscriber in the same Collaboration Pool as system1.hp.com. The Subscriber (system2.hp.com) notices all 3 new Event Descriptors and processes them. First, it logs the user in to itself automatically, based on the information available in the first (login) Event Descriptor. Next, it updates its local copy of the user's email address based on the change posted in the second (email address modification) Event Descriptor. Third, it logs the user out. All this happens automatically while initializing system2.hp.com handling of the user request. When such initialization is finished, the Subscriber server-side state is now consistent with the Publisher server-side state (both are logged-out). The request is then handled by the Subscriber as usual.

By way of further illustration, it will be appreciated that the previous example is clearly sub-optimal, because in that simple embodiment the Subscriber failed to recognize the opportunity to be more efficient in replicating Events. Thus, in the preferred embodiment of this inventive approach, the Subscriber considers whether any of the newly-detected Event Descriptors might overrule any of the other, based on optimization heuristics. Since logout obviates the need for handling any Event instance preceding it, the Subscriber in this example thus automatically optimizes-away the first 2 of the 3 new events. It then goes on to replicate logout immediately rather than needlessly incurring the login and email-address-modification replication first. Besides the aforementioned optimization heuristic for logout (which cancels all prior Events), other typical heuristics that would be employed in this example system might be: email-address-modification cancels prior instances of the same Event; while login cancels all other Events whether prior or subsequent. The precise nature of each heuristic varies on how each kind of Event is handled by a particular Subscriber, though.

A Subscriber need only replicate those Events in which it is interested, ignoring the others. As a further example built upon the preceding one, consider another Subscriber (system3.hp.com) which is merely interested in tracking whether the user is logged-in or not. This Subscriber would completely ignore any detected new email-address-modification Event Descriptors, instead considering only the login and logout ones.

The foregoing definitions and examples have been provided merely to provide guidance in understanding the description that follows, but should not be construed to impose strict construction limitations upon the claims.

Figure 8:
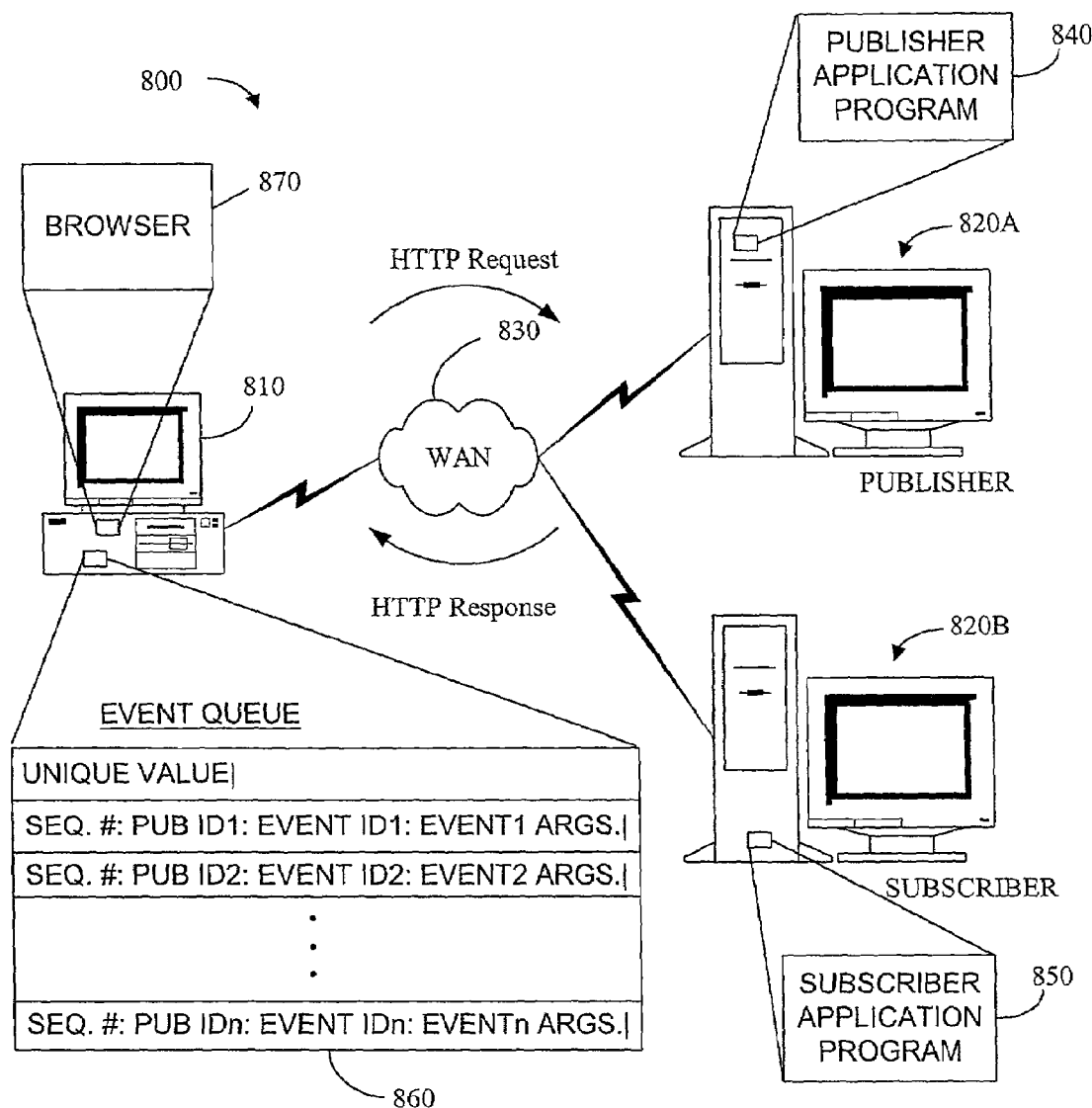
FIG. 8 is a diagram illustrating certain principle components in a system 800 constructed in accordance with a preferred embodiment of the invention.

Reference is now made to FIG. 8, which is a diagram illustrating certain principle components in a system 800 constructed in accordance with the preferred inventive approach of the present invention. Specifically, the diagram of FIG. 8 illustrates a client computer 810 configured for communication with collaborating server computers 820A and 820B, each with independent server-side state repositories. For purposes of this illustration, server 820A is designated as a publisher server, while server 820B is designated as a subscriber server. As previously mentioned, the same physical server may operate as a publisher server in some instances, while acting as a subscriber server in other instances. The designations given to servers 820A and 820B of FIG. 8 have been assigned purely for purposes of illustrating certain concepts of the preferred system and method. Furthermore, it should be appreciated that the collaboration pool comprising servers 820A and 820B may contain any arbitrary number of servers; FIG. 8 only illustrates two such servers 820A and 820B because that is the number sufficient to demonstrate the invention.

Client computer 810 and collaborating server computers 820A and 820B may each utilize any of a wide variety of commonly-available, heterogeneous computer hardware platforms, such as Intel Pentium or IA-64, HP PA-RISC, etc (INTEL and PENTIUM are registered trademarks of Intel Corporation). Similarly, client computer 810 and collaborating server computers 820A and 820B may each utilize any of a wide variety of networking-enabled computer operating system software, such as Microsoft Windows NT/2000/98/95 (MICROSOFT and WINDOWS are registered trademarks of Microsoft Corporation), HP-UX, etc. It should thus be understood that the invention is not limited to any particular computer hardware or operating system, nor is it limited to homogeneity in use of the same platform in any combination of computers in the system. Indeed, the invention is intended for use across a diversity of such platforms, without hardware or operating system being a constricting factor on the invention's employment.

Transport-level communication among the various computers 810, 820A, and 820B occurs across a computer network 830 (preferably a wide-area network such as the Internet) using a Web protocol such as HTTP or HTTPS. Since the mechanisms and protocols for carrying out communications over a computer network are well known, they need not be described herein.

Each of the various computers 810, 820A, and 820B further comprises application software executed by their respective operating systems, in accordance with mechanisms well known in the art. Specifically, client computer 810 uses Web user agent (i.e., "browser") software 870 for application-level communication with the collaborating server computers 820A and 820B. Any of a wide variety of commonly-available browser programs are usable for browser 870, with the only restriction being that such browser programs must support whatever client-side state technique is used within system 800 (preferably, HTTP cookies are employed). For example, such popular browser programs as Microsoft Internet Explorer and Netscape Navigator/Communicator are usable for browser 870. (Of course, custom browser programs are also usable for browser 870, but it is advantageous, both in terms of cost-of-implementation and ease-of-adoption, for standard browser programs to be used instead.)

Similarly, collaborating server computers 820A and 820B typically employ any of a wide variety of commonly-available Web and/or application server software, with the only restriction being that such server programs are extensible with custom logic. Such extensibility is necessary when commonly-available Web and/or application server software is used, so that the crucial inventive methods encoded within publisher application program 840 and subscriber application program 850 can be integrated properly therein. A wide variety of server-extension architectures are known in the art for enabling such extension (such as CGI, FastCGI, servlets, and server API), supported by many commonly-available Web servers (such as Microsoft Internet Information Server, Apache Web Server, and Netscape Server) and application servers (such as BEA WebLogic Server). The present invention should be understood to embrace all such standard Web and application server programs and extension architectures, and not to be constricted by such platform or environmental considerations. (Of course, custom Web and/or application server software may alternatively be used, incorporating publisher program 840 and subscriber program 850 along with standard Web and/or application server methods, but it is advantageous, both in terms of cost-of-implementation and ease-of-adoption, for standard Web and/or application server software to be used and extended as described above instead.)

Regarding publisher application program 840 and subscriber application program 850, these programs generally will comprise program segments or a sequence of coded instructions for executing certain tasks, which will be described in more detail below. When the publisher application program 840 and the subscriber application program 850 are implemented in software, as is shown in the illustrated embodiment, it should be noted that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The programs 840 and 850 can be embodied in any computer-readable medium for use by or in connection with an instruction execution system, apparatus, or device, such as a computer-based system, processor-containing system, or other system that can fetch the instructions from the computer-readable medium and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

With regard to the publisher application program 840, it should be appreciated that this program operates to carry out certain publisher tasks, and includes certain program segments or mechanisms in order to carry out these tasks on a publisher server 820A. These tasks and mechanisms will be described in more detail below in connection with FIGS. 10 and 12. Likewise, the subscriber application program 850 carries out certain tasks and includes certain program segments for carrying out these tasks on a subscriber server 820B. These tasks and mechanisms, with regard to the subscriber application program 850, will be described in more detail in connection with FIGS. 11 and 13 below.

Figure 9A:
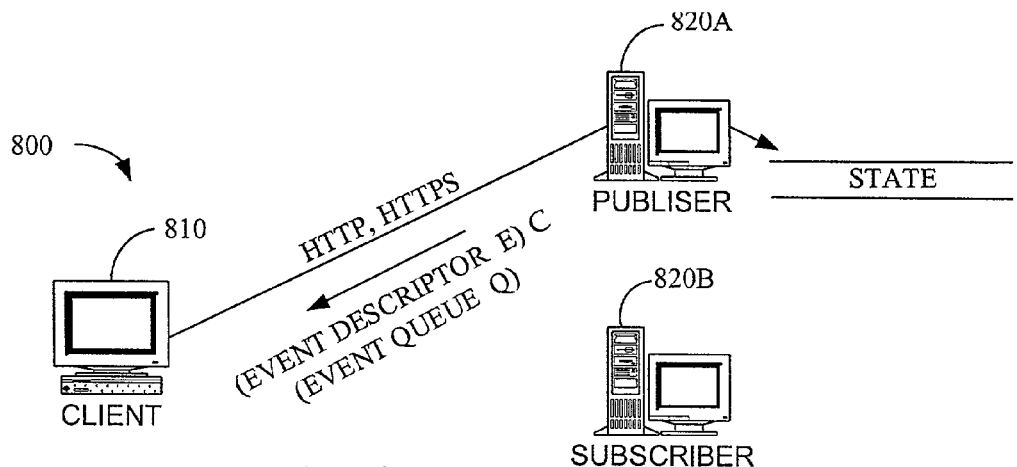
FIGS. 9A–9C are diagrams illustrating the connections among collaborating Web servers, in accordance with a preferred embodiment of the invention.
Figure 9B:
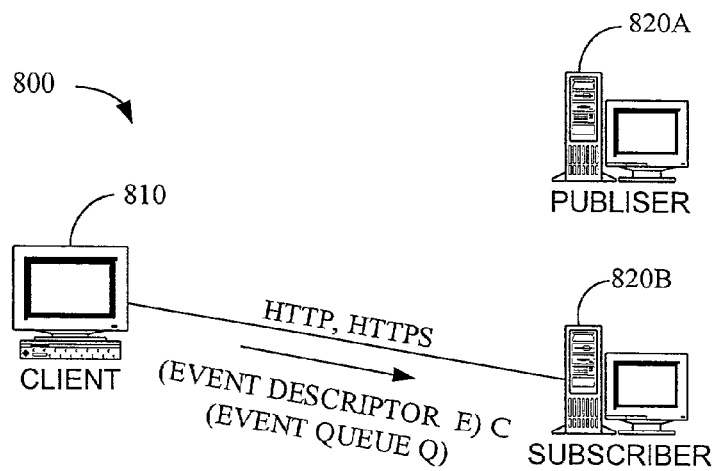
Figure 9C:
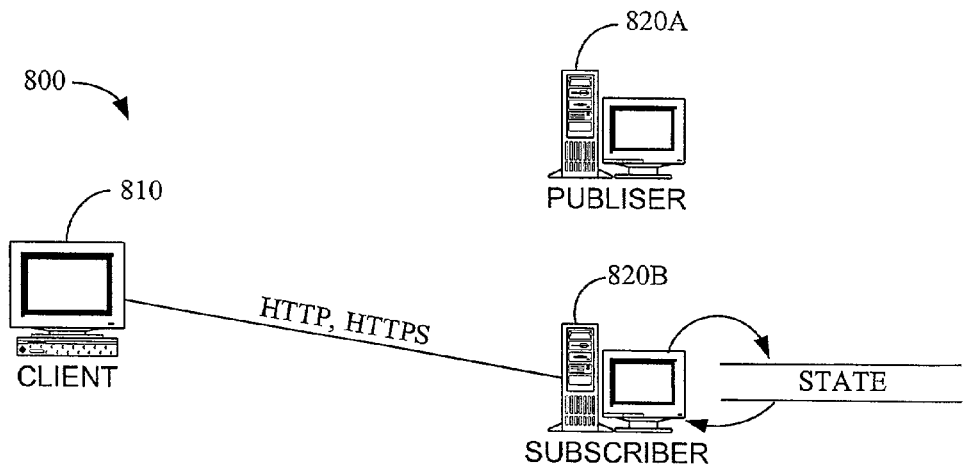

Turning now to FIGS. 9A–9C, these diagrams show how state replication system 800 operates to maintain consistent server-side state throughout the system on an as-needed basis, according to the preferred inventive approach of the present invention. Initially (FIG. 9A), client 810 establishes an HTTP/HTTPS connection to collaborating Web server 820A and performs some event (for example, login) which results in a change of some kind to server-side state for server 820A (for example, population of state with registered user information). For purposes of the present invention, the nature of the change to server-side state may constitute creation, modification, or deletion of data. In response, server 820A generates an event descriptor E, describing that unique event occurrence, and adds it as the most recent event to the event queue Q which is returned as part of the HTTP response from server 820A to client 810. Collaborating server 820A is thus referred as the "publisher" in this scenario. Note that event queue Q is transported in the response in such a way that client 810 loads it into client-side state for the collaborating Web servers 820*n*. In the preferred embodiment of the invention, event queue Q takes the form of an HTTP cookie whose domain is set such that it is sharable among all the collaborating Web servers 820*n*.

At a later time (FIG. 9B) client 810 establishes a connection with collaborating Web server 820B, which requires collaborating Web server 820B to read server-side state. Note that, because collaborating servers 820A and 820B employ independent state repositories, state data within server 820B's repository is now inconsistent with state data affected by the previous event on publisher server 820A (FIG. 9A). Note also, though, that the request from client 810 to server 820B includes the event queue Q set in response to the previous event on publisher server 820A (FIG. 9A). Thus, by comparison with the previously-received event queue, server 820B is able to discern the new event descriptor E from event queue Q, and replicate the effects of that event into server-side state for server 820B (FIG. 9C). (Server 820B also must make note of the event queue Q and its new event descriptor E for next time, so that the event is not needlessly replicated in the future.) Thus server 820B is referred to as the "subscriber" in this scenario. If the client request of FIGS. 9B–9C itself constitutes another event, collaborating Web server 820B will assume the publisher role during such handling and response. And likewise, if the event is relevant to collaborating Web server 820A, in the next request made by client 810 to server 820A that server will then assume the role of subscriber.

Note that the replication shown in FIG. 9C must occur immediately, before subscriber server 820B continues with handling the client request and generating the response, so that state data on which such handling and response is dependent will have been first made current. Such replication occurs via any manner sufficient to update subscriber server 820B state to be consistent with that of publisher server 820A. For example, in some embodiments and for certain kinds of events, the event arguments within event descriptor E contain the actual data needing replication, so that the data may be populated directly to state by subscriber server 820B. In other embodiments, or for other kinds of events, the actual data needing replication is obtained by subscriber server 820B from a remote system (e.g., publisher server 820A, or a common database server for all collaborating servers 820A and 820B), using any of a wide variety of remote procedure call methods known in the art. (Connection parameters for such remote procedure calls are transported in some such cases within the event arguments of event descriptor E.) And some kinds of events in some embodiments can be replicated immediately and locally on subscriber server 820B without reference to any event argument or remote system (e.g., a logout event—terminating the current session and erasing current session state data—would typically be such a kind of event, in many embodiments).

Returning to FIG. 8, the format of an event queue 860 is illustrated on the client computer 810. As has been described earlier, an event queue is a unique list of one or more event descriptors accumulated over the course of a series of interactions between client computer 810 and collaborating servers 820*n*. Each event descriptor identifies the occurrence of a particular event within the lifetime of that queue. As has also been described, an event is an activity triggered by client 810 against publisher server 820A which affects that server's independent server-side state, thus requiring as-needed replication to subscriber server 820B. Event queue 860 is maintained in client-side state for the duration of the server-side state needing replication, and is exchanged with collaborating servers 820*n* to achieve such replication, as shown in FIGS. 9A–9C. A number of client-side state mechanisms will suffice for event queue transport, but in the preferred embodiment a single HTTP cookie is used (e.g., in another embodiment, a URL query string might be used instead). Similarly, in the preferred embodiment the event queue is transported as a whole, but in other embodiments it might be transported in pieces, as a collection of event descriptors (e.g., in one such embodiment, multiple distinct HTTP cookies might be used for the event queue, with one cookie per event descriptor). In any case, the present invention should be understood to embrace all such mechanisms for client-side state transport of the event queue, whether as a whole or in pieces.

Various embodiments of the present invention will use differing formats for event queue 860. The invention should be understood to embrace all such formats consistent with the above-given definitions for event queues and event descriptors. However, an illustrative format for event queue 860 is shown in FIG. 8. In the illustrated embodiment, the event queue 860 begins with a unique value (such as a timestamp or pseudorandom number), which exclusively differentiates each event queue instance (and by extension the event descriptors within each) from others (whether queues for different clients or queues from earlier sessions of the same client). The unique value is assigned by the publisher when the event queue is first created (i.e., when the initial event is published into a new queue). Following the unique value, and delimited from one another in this exemplary embodiment with the ASCII pipe character, are one or more event descriptors. In this exemplary embodiment, the event descriptors do not need to be maintained in sorted order because they are marked with sequence numbers from which order can be inferred. (For purposes of readability, note that event queue 860 has been illustrated such that the unique value and event descriptors are each presented on a separate line in the drawing of FIG. 8.)

Each event descriptor within event queue 860 is illustrated as including a sequence number, a publisher ID, an event ID, and a container for one or more event arguments as needed based on the type of event. In this exemplary embodiment, these fields within each event descriptor are delimited from one another by the ASCII colon character.

The sequence number in the exemplary event queue 860 is an ASCII numeric string, representing an integer, representing the order in which events occurred. Thus, every event descriptor has a unique sequence number, and the value of that sequence number indicates the order of events, while the relative positions of event descriptors within event queue 860 are meaningless. For instance, sequence number "1" represents an event that occurred before sequence number "2" within the lifetime of the queue, whereas the position with respect to one another of those two event descriptors within the queue has no meaning. (Other embodiments, of course, may omit explicit sequence numbers and instead assign sequencing based on position.)

The publisher ID within the exemplary event queue 860 is a very short ASCII string, which represents the publisher server 820A which authored the event descriptor (i.e., the server on which the client performed the event). This information may be used by subscribers in some systems to determine whether to ignore or consider certain events. However, a publisher ID is not considered part of the minimal specification for an event descriptor, as previously given for the present invention. In fact, in the illustration of FIG. 8, it exists mainly to show how, in different embodiments, event descriptors and queues can contain information beyond what is minimally specified in the present invention.

The event ID is a datum (preferably a very short ASCII string, in this exemplary embodiment) representing the kind of event that occurred. The actual event ID values are not significant, so long as they are known and agreed upon by the various publishers and subscribers in the collaborating system of web servers. For example, and in keeping with the examples that have been presented herein, event identifiers for a customer information state object may include the strings "login," "logout," and "update-password."

Finally, event arguments is a container for any arguments needed to describe the event instance. In practice, the event arguments will vary from system to system, but like the event ID's will generally comprise a known or agreed upon syntax and vocabulary for each particular kind of event. For example, in some embodiments and for certain kinds of events, the event arguments will transport the literal data to be replicated into subscriber state (as in an "update-password" event ID with the new password as the event argument). In other embodiments or for other kinds of events, the event arguments will transport connection information to facilitate subscribers' retrieval of the data to be replicated from a remote system (as in a "login" event ID with connection information for retrieving the registered user information from the publisher server or a common database). And in some embodiments, certain kinds of events will not require event arguments to enable replication at all (as with a "logout" event ID, since logout—erasure of session state—can typically proceed without parameters in many embodiments). In any case, it will be appreciated that, because in this exemplary embodiment certain characters are significant (such as the delimiting ASCII colon and pipe characters), some encoding standard may need to be agreed-upon by the collaborating servers' publisher program 840 and subscriber program 850 in order to avoid ambiguity from the use of such characters as literal values within event arguments. By way of example, an argument for a "login" event identifier may be the user ID and password, with the so-called "URL encoding" standard (well known in the art) employed for encoding this data.

The event queue 860 is illustrated in FIG. 8 as having a plurality of event descriptors, numbered 1, 2, through n (e.g., "EVENT ID1," "EVENT ID2," . . . ). It should be appreciated that, in certain embodiments, such an event queue 860 may be permitted to grow without bound as new event descriptors are added by publishers. This is acceptable, for example, in relatively simple systems 800 with low event frequency relative to the lifetime of the event queue (which, as has been previously noted, only need be as long as the lifetime of the server-side state being replicated). However, in the preferred embodiment, some sort of "garbage collection" mechanism is implemented to minimize or at least reduce the size of the event queue. In this regard, it is known that cookies are generally limited to a maximum size of 4K bytes and a maximum number of 20 cookies per domain, while other client-side state techniques likewise have relatively low size limits. Therefore, it is necessary to limit the growth and size of event queues 860, when they are transported using cookies or other size-limited client-side state within systems 800 where event queue overflow is anticipated (due to high event frequency and/or long event queue lifetimes). Such a garbage collection or reduction mechanism is optional, and the present invention should not be construed as being limited by requiring such a mechanism, nor should the present invention be limited as to any particular mechanism that may be implemented for carrying out this function. (An example of such a garbage collection strategy for event queues is given in the discussion of stage 1025 of FIG. 10, below.)

Figure 10:
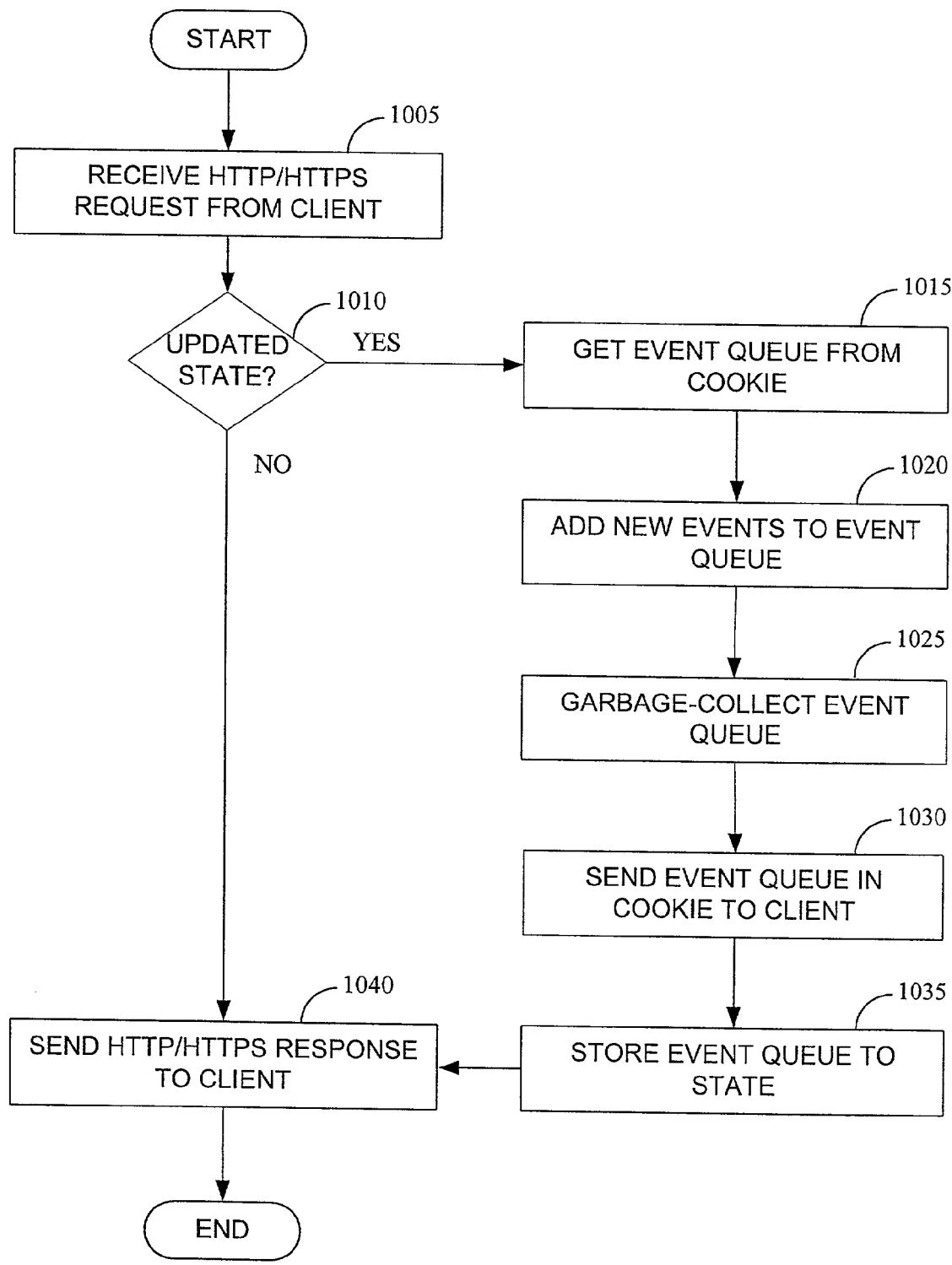
FIG. 10 is a flowchart illustrating the top-level operation of a publisher collaborating Web server, in accordance with a preferred embodiment of the invention.

Reference is now made to FIG. 10, which is a flow chart illustrating the top-level operation 1000 of a publisher application program 840, constructed in accordance with the preferred inventive approach of the present invention. Initially, publisher collaborating server 820n receives an HTTP/HTTPS request from a client 810 (stage 1005) and processes it in the standard manner well known in the art. Before generating an HTTP response, however, stage 1010 determines whether the request involved processing of one or more events, where an event is any processing which writes (creates, modifies, or deletes) server-side state within the independent state repository of the same collaborating server 820n. (Because the preceding discussion has extensively defined, described, and illustrated the concept of an event, no further discussion in that regard should be required at this point.)

If no events occurred while processing the HTTP/HTTPS request, then operation 1000 may proceed to complete generating and transmitting the HTTP response to client 810 (stage 1040), as in a standard Web server program. But if any events occurred while processing the HTTP/HTTPS request, then it is the purpose of stages 1015–1035 to publish new event descriptors for those events to the event queue of client 810. As previously described, in the preferred embodiment of the invention HTTP cookies are used to transport the event queue between client 810 and collaborating servers 820n. Thus such publication of new event descriptors begins by obtaining the current event queue from the appropriate HTTP cookie in the request (stage 1015), so that it might be added-to. Note that in the case where no events have yet been published during the lifetime of the queue, this step will obtain a null value.

Thereafter, an event descriptor is created for each new event that resulted in a change of state information (stage 1020). The new event descriptor(s) are added to the event queue with their sequence set so as to match the order of the events' occurrence. Note that in the case where stage 1015 obtained a null event queue, this stage allocates a new event queue in the process of adding the new event descriptors to the queue. In some embodiments, this includes allocating a new unique value to differentiate the newly-allocated event queue from all others. (Because the preceding discussion has extensively defined, described, and illustrated the concepts of an event queue and an event descriptor, no further discussion in that regard should be required at this point.)

As previously described, an optional stage 1025 may be provided next, whereby the size of the newly-produced event queue is reduced or minimized to eliminate superfluous, redundant, or stale event descriptors that may exist within the event queue. The need for such garbage collection will vary between embodiments of the invention. Generally, garbage collection will become more necessary as the event frequency and/or event queue lifetime grow, and/or the storage space available for the event queue within client-side state shrinks. In systems which omit garbage collection of the event queue, stage 1025 simply performs no work.

In those systems which do employ garbage collection at stage 1025, the techniques used will likewise vary between embodiments of the invention. For example, a simple garbage collection technique is for each new event descriptor to overlay any previous event descriptor in the queue for the same kind of event. In that way the size of the event queue will never exceed the number of events defined within the system (i.e., all publishers in the collaboration pool), while at the same time a simple form of optimization is performed by the publisher on behalf of all subscribers (rather than necessitating subscribers' optimization steps to do so—see the discussion regarding stage 1130 of FIG. 11, below). However, this simple technique assumes that all subscribers within the collaboration pool agree upon that common optimization logic, so that it may safely be performed by publishers to achieve the double purposes of both optimization and garbage collection. In systems where this assumption is not valid, other garbage collection techniques will need to be employed. For example, dating event descriptors and expiring and removing them (even short of the queue expiration) is a more-sophisticated technique that could be employed at stage 1025. Another, simpler technique would be maintaining a maximum queue size with FIFO (first in, first out) garbage collection.

In any case, after adding new event descriptors to the queue and possibly performing garbage collection on the queue, operation 1000 is now ready to store the newly-generated event queue into client-side state. This occurs at stage 1030. Because the preferred embodiment employs HTTP cookies as the client-side state mechanism for transport of the event queue, stage 1030 entails sending the event queue to client 810 within the appropriate HTTP cookie defined in the system for event queue transport. (This is the same cookie from which the prior event queue was retrieved in stage 1015; thus publication of an updated event queue overwrites the prior event queue.)

As is well known in the art, HTTP cookies are scoped within certain domains and expiration timeframes. In this regard, the event queue cookie sent at stage 1030 must have a domain sufficiently expansive to embrace all collaborating servers 820*n* within the collaboration pool. Otherwise, the newly-produced event queue will not propagate to all of the other collaborating servers, disrupting the ability of the system to maintain consistent server-side state throughout the collaboration pool. With respect to the cookie expiration time, this must be set (or left unset) according to the lifetime desired for the event queue within the system. For example, if the server-side state being maintained consistent is merely session state, then the cookie must not have an expiration time sooner than the anticipated end-of-session. Otherwise, the event queue will be lost before the session is over, disrupting the ability of the system to maintain consistent server-side session state throughout the duration of the session.

In general, note that the cookie expiration time specified (or not) at stage 1030 defines the event queue lifetime, and the event queue lifetime in turn defines the interval over which events will be replicated. An interval, too short relative to the lifetime of the server-side state to be replicated, will be catastrophic, resulting in disrupted and inconsistent server-side state over the course of the state's lifetime. Conversely, an interval, longer than the lifetime of the server-side state to be replicated, may have the interesting (but not necessarily catastrophic) effect of replicating the previous event sequence and thus potentially re-instating the previous server-side state. In various embodiments, this will (or will not) be a desired effect. To summarize, cookie expiration must be given full consideration by implementers of the present invention, so that at stage 1030 cookie expiration time is specified (or not) with full intention.

Finally, the newly-generated event queue is additionally stored into state for publisher collaborating server 820*n* (stage 1035). Such local state for storage of the newly-generated event queue may be server-side (in the method of the preferred embodiment) or even client-side, so long as the same state object is used as referred to in stages 1120 and 1150 of FIG. 11, discussed below. Stage 1035 serves to allow subscriber application program 850, when (and if) executed later on the same particular collaborating server 820*n* in the context of handling a later request from the same client 810, to retrieve its most-recently-experienced event queue for client 810 from 820*n* state (stage 1120 of FIG. 11, discussed below). Subscriber application program 850 can then use that event queue to discern new events (stage 1125 of FIG. 11), such that events published by publisher application program 840 on the same server are not inadvertently considered new events (otherwise needless replication of events already accrued locally would occur). This is further discussed below (operation 1100 of FIG. 11).

Stage 1035 completes the steps necessary for publishing whatever new event(s) occurred during the course of receiving and handling the HTTP/HTTPS request (stage 1005). Thus operation 1000 is now able to complete generating and transmitting the remainder of the HTTP response (stage 1040), in the standard manner which is well known in the art. At this stage, operation 1000 terminates.

Figure 11:
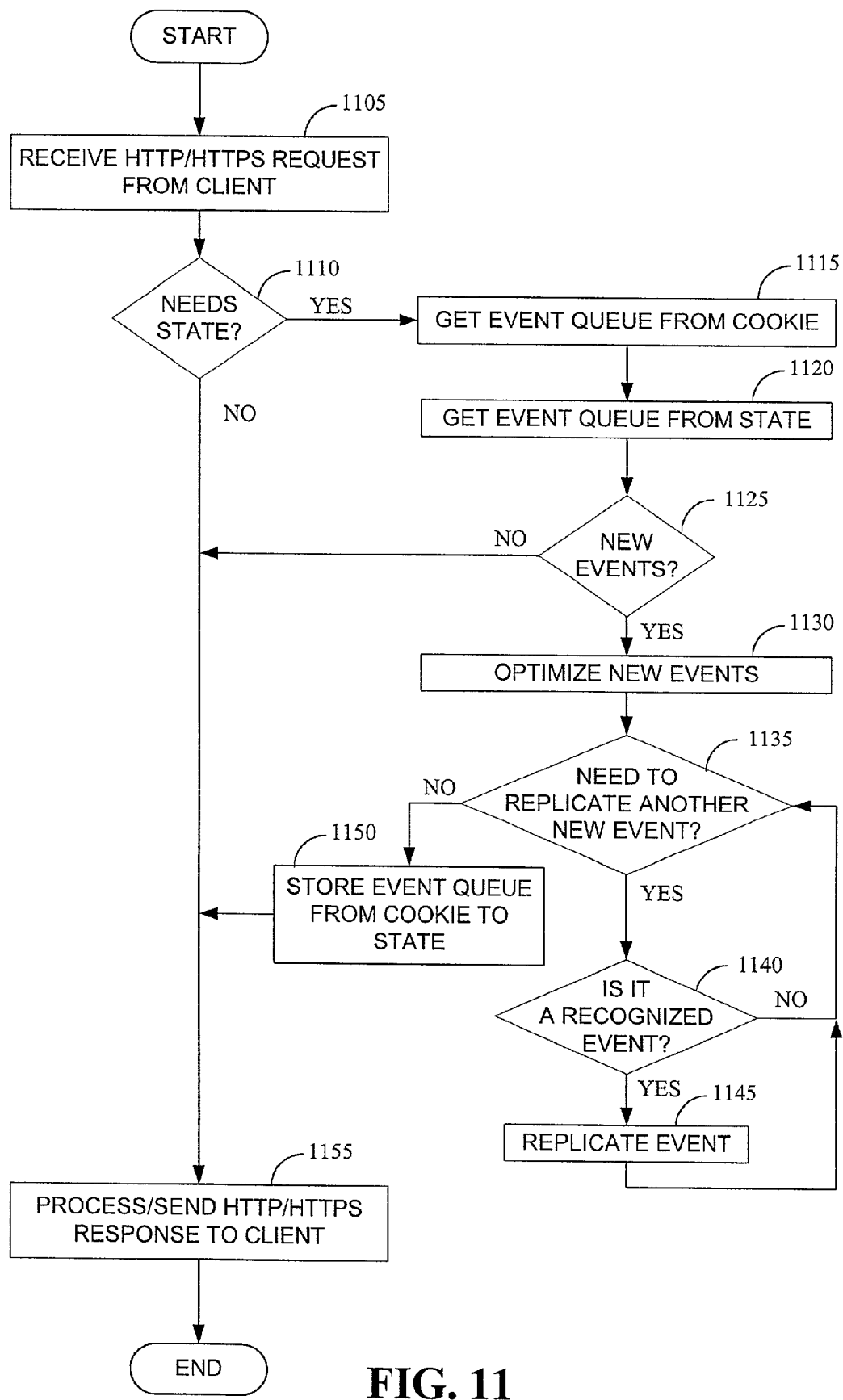
FIG. 11 is a flowchart illustrating the top-level operation of a subscriber collaborating Web server, in accordance with a preferred embodiment of the invention.

Reference is now made to FIG. 11, which is a flow chart illustrating the top-level operation 1100 of a subscriber application program 850 constructed in accordance with the preferred inventive approach of the present invention. Initially, an HTTP/HTTPS request, sent from a client computer 810, is received by subscriber collaborating server 820*n* at stage 1105 in ways that are well known in the art. Before processing the request and generating an HTTP response, however, operation 1100 must determine whether there is a need to first synchronize server-side state by replicating any new events (published previously by a remote publisher application program 840 using the above-described method of FIG. 10).

First in this determination, the method of the invention recognizes that HTTP requests whose processing does not entail server-side state do not need to replicate events. To this end, operation 1100 determines whether the request is one whose processing will be dependent on the server-side state within the independent state repository of subscriber collaborating server 820*n* (stage 1110). If not, then operation 1100 proceeds to process the request and generate and transmit the HTTP response accordingly, in the standard manner of Web servers well known in the art (stage 1155). But if so, operation 1100 in stages 1115–1125 proceeds to discern whether any new events exist, not previously published or replicated by this collaborating server 820*n*.

Discernment of new events begins in stage 1115, by obtaining the current event queue so that it might be examined. As previously described, in the preferred embodiment of the invention HTTP cookies are used to transport the event queue between client 810 and collaborating servers 820*n*. Thus to obtain the current event queue, stage 1115 refers to the appropriate HTTP cookie in the request. Note that in the case where no events have yet been published during the lifetime of the queue, this step will obtain a null value.

Next operation 1100 obtains the most-recently-experienced event queue for client 810 from state for this subscriber collaborating server 820*n* (stage 1120). This is the event queue as it was most recently published and/or subscribed by this collaborating server 820*n*. In some cases, for example, the most recent occurrence with respect to the event queue on this server 820*n* will have been publication. Thus the event queue obtained from state in stage 1120 will be that which was stored at that time by publisher application program 840 (stage 1035 of FIG. 10, discussed above). In other cases, the most recent occurrence with respect to the event queue on this server 820*n* will have been subscription. Thus the event queue obtained from state in stage 1120 will be that which was stored at that time by subscriber application program 850 (stage 1150 of FIG. 11, discussed below). And in some cases, no event queue will previously have been experienced for this client 810, so stage 1120 will obtain a null value. Note that the form of storage utilized for the most-recently-experienced event queue, in any case, may be server-side (in the method of the preferred embodiment) or even client-side, so long as the same state object is used as referred to at stage 1035 of FIG. 10 and stage 1150 of FIG. 11.

Now that both the current and most-recently-experienced event queues have been obtained, they are compared to discern any new events (stage 1125). This comparison operation takes into account whatever provision for event queue uniqueness the particular embodiment has made. For example, in the preferred embodiment where a unique value heads the event queue, unique values are compared for equality (null event queues are considered equal to one another and unequal to any non-null event queue). The uniqueness comparison ensures the current and most-recently-experienced event queues truly correspond to the same event queue lifetime. If they do not, then stage 1125 considers all event descriptors (if any) within the current event queue to be new (as it may be assumed that the most-recently-experienced queue actually corresponds with a previous event queue, from another lifetime, and thus has no bearing on the current event sequence).

If both the current and most-recently-experienced event queues refer to the same event queue lifetime (as ensured by the uniqueness comparison), stage 1125 further compares the event descriptors within both queues and extracts those in the current queue which are not in the most-recently-experienced queue. (Since each event descriptor must have a unique sequence, or position, within its queue, this aspect may be used to distinguish which descriptors in the current queue are not also present in the most-recently-experienced queue.) All such event descriptors (if any) are deemed to be new.

In any case, if stage 1125 discerns no new event descriptors as described above, then this signifies that server-side state for this collaborating server 820*n* is already up-to-date. Thus operation 1100 proceeds to process the request and generate and transmit the HTTP response accordingly, in the standard manner (stage 1155). But if stage 1125 discerns any new event descriptors, then this signifies that server-side state for this collaborating server 820*n* is out-of-date. Stages 1130–1150 are thus executed to synchronize server-side state by replicating those new events (which stage 1125 extracts from the current event queue into an ordered list of event descriptors, necessarily comprising a subset of that queue).

The first step to replicate new events is an optional stage 1130, which optimizes the ordered list of new events discerned in stage 1125, for maximal efficiency in execution. As previously discussed, this is an optional stage which employs optimization heuristics to detect and eliminate from consideration any events (in a list of ordered events), which are superseded or rendered superfluous by other events in the same list, as judged by what the effects of replicating the events in order (stages 1135–1145) would be on server-side state. These optimization heuristics will vary greatly from one embodiment of the present preferred inventive approach to another, and from one kind of event to another. They may even vary from one subscriber application program 850 to another within the same system 800, as different subscriber servers 820*n* may have heterogeneous server-side state in which event-state effects vary.

In fact, precisely because event-state effects may vary from one subscriber server 820*n* to another, that is why optimization heuristics of the form employed at stage 1130 are executed at that point, rather than in the optional garbage collection stage 1025 of publisher application program 840 (FIG. 10), previously described. That is, because optimization has the side-effect of shrinking the number of relevant event descriptors within an event queue, any optimization heuristics which all subscriber servers within collaboration pool 820*n* agree upon can, and should, be performed by publishers, for purposes of both common optimization and garbage collection, at stage 1025. But because optimization heuristics are generally only valid within the context of certain assumptions about event effects on subscriber server-side state, which effects in some embodiments vary from one set of subscriber servers to another within collaboration pool 820*n*, in those embodiments it is not possible for publishers to perform those subscriber-specific optimizations. Thus subscriber-specific optimization heuristics are reserved for stage 1130 of FIG. 11, while universal optimization heuristics are reserved for stage 1025 of FIG. 10, where they can serve as garbage collection principles as well.

Examples of possible optimization heuristics which could be employed at stage 1130 have already been given. To recapitulate, in some embodiments it might be the case that replication of the latest occurrence of a particular kind of event in stage 1145 suffices for replicating all previous occurrences of the same kind of event. In such embodiments, an optimization heuristic which capitalizes on that aspect of the system would be to allow the latest event descriptor of that kind within the ordered list of new events to cancel any earlier descriptors in the list of the same kind. For example, this optimization heuristic would often be employed with respect to the "logout" event type: since logout in many systems often simply just erases server-side session state, such that multiple "logout" events are redundant, therefore it is necessary to retain for replication only the latest "logout" in order to achieve that effect.

Other optimization heuristics are conceivable. For example, in some embodiments it might be the case that replication of the latest occurrence of a particular kind of event in stage 1145 suffices for replicating previous and/or subsequent occurrences of other kinds of event. An optimization heuristic taking advantage of this aspect could be employed at stage 1130. For example, consider a system 800 in which replication of an "update-name" event at stage 1145 would consist of reading the new name from a user information database into server-side session state; and in which replication of a "login" event at stage 1145 would consist of reading not just the new name, but in fact all of the user information (email address, phone number, etc) from the database into server-side session state. In such a system, the effect of replicating "login" at stage 1145 would suffice for replicating any "update-name" in the same ordered list of new events, whether the "update-name" event is sequentially before or after the "login" event. Thus an optimization heuristic which exploits this would be to allow any "login" event descriptor within the ordered list of new events to cancel any "update-name" event descriptor in the same list.

There are countless other examples of optimization heuristics. The application of any and all such heuristics at stage 1130 should be considered within the scope of this invention. Of course, some simple embodiments may omit optimization of the ordered list of new events, in which case stage 1130 simply performs no work.

In any case, after any optimization has been performed upon the ordered list of new events, operation 1100 begins replicating the new events, in ascending order of the event descriptors within the list (stages 1135–1145). For each such new event (stage 1135), if the event is recognized by the subscriber application program 850 (stage 1140), its effects on server-side state are replicated (stage 1145). This continues until all such new events have been thus processed. Note that because subscriber servers 820*n* may have heterogeneous Web applications, different subscriber servers 820*n* may only need to recognize, and replicate, different kinds of events. Stage 1140 serves this purpose. For example, suppose the subscriber server is one that only monitors whether or not the user is currently logged-in. Such a subscriber would need to recognize, and replicate, such events as "login" and "logout", but conversely would not need to recognize any events having merely to do with modification of user information. For example, if the new event descriptor being evaluated at stage 1140 pertains to a modification of the user's name-of-record (i.e., an "update-name" event), then the data relating to that change need not be replicated to the current subscriber server. Indeed, there are countless examples that could be presented here, each of which are application specific, and therefore beyond the scope of the present discussion.

Regarding actual event replication itself (stage 1145), note that this stage may employ whatever heterogeneous technique is operative in the system for replicating the effects of that event accordingly into server-side state. For example, in some embodiments and for some kinds of event, the information contained within the event arguments of the event descriptor will be sufficient for direct population into server-side state at stage 1145 (after any decoding of the event arguments, possibly necessitated for transport reasons, as has been previously discussed). For instance, this would be the case in an embodiment in which the "update-name" event was defined and published such that it transported the new user name-of-record, with sufficient transport encoding, in its event arguments. As another example of event replication techniques, in other embodiments or for different kinds of event, the information contained within the event arguments will allow stage 1145 to retrieve the state data from a remote server, for subsequent population into server-side state. For instance, the remote server might be the publisher server 820*n* itself, or a common database server; and the "login" event arguments might transport the user ID of the user whose information is to be retrieved. Of course, a variety of different application-layer protocols could be used in various embodiments to perform this retrieval, built upon a number of different remote method invocation protocols (such as Java RMI, SOAP, DCE, etc). Likewise, a variety of application client interfaces and server objects could communicate using any of the protocols to accomplish the retrieval of the data. Thus the present invention is not limited to any particular event replication technique at stage 1145.

Finally, the last step in synchronizing server-side state by replicating events occurs at stage 1150, executed after all new, recognized events have been replicated in stages 1135–1145. At stage 1150, the current event queue must be stored into state for this subscriber server 820*n*, so that future comparisons (stage 1125) will operate against that queue as the most-recently-experienced queue. In this way, accidental re-subscription to events already replicated is avoided. The state used for storage of the current event queue at stage 1150 may be server-side (as in the preferred embodiment) or even client-side, but in any case the same state object should be used as referred to in stage 1120 of FIG. 11 and stage 1035 of FIG. 10, both previously described.

Stage 1150 completes the steps necessary for bringing server-side state up-to-date on subscriber server 820*n*. In other words, subscriber server 820*n* server-side state is now consistent with the latest series of events. Thus operation 1100 is now able to begin processing the HTTP request in ways well known in the art, ultimately generating and transmitting an appropriate HTTP response to client 810 (stage 1155). At that stage, operation 1100 terminates.

Note that other embodiments of the present preferred inventive approach may forego the use of HTTP cookies altogether for transport of the event queue. In general, any client-side state mechanism supported by client 810 and characterized by mutual accessibility throughout collaboration pool 820*n* may be used. In such embodiments, publisher application program 840 operation (FIG. 10) would generally be as described above, except stages 1015 and 1030 would arrange for the event queue to be accessed according to the chosen client-side state mechanism. Similarly, subscriber application program 850 operation (FIG. 11) would generally be as described above, except stage 1115 would arrange for the event queue to be accessed according to the chosen client-side state mechanism.

It should further be appreciated that the flow charts of FIGS. 10 and 11 show the top-level operation of only one possible implementation of the methods of the present invention. In this regard, each block represents a module, segment, or portion of code, which comprises one or more executable instructions for implementing the specified logical function(s). It should also be noted that in some alternative implementations, the functions noted in the blocks may occur out of the order noted in FIGS. 10 and 11. For example, two blocks shown in succession may in fact be executed substantially concurrently or the blocks may sometimes be executed in the reverse order, depending upon the functionality involved.

Figure 12:
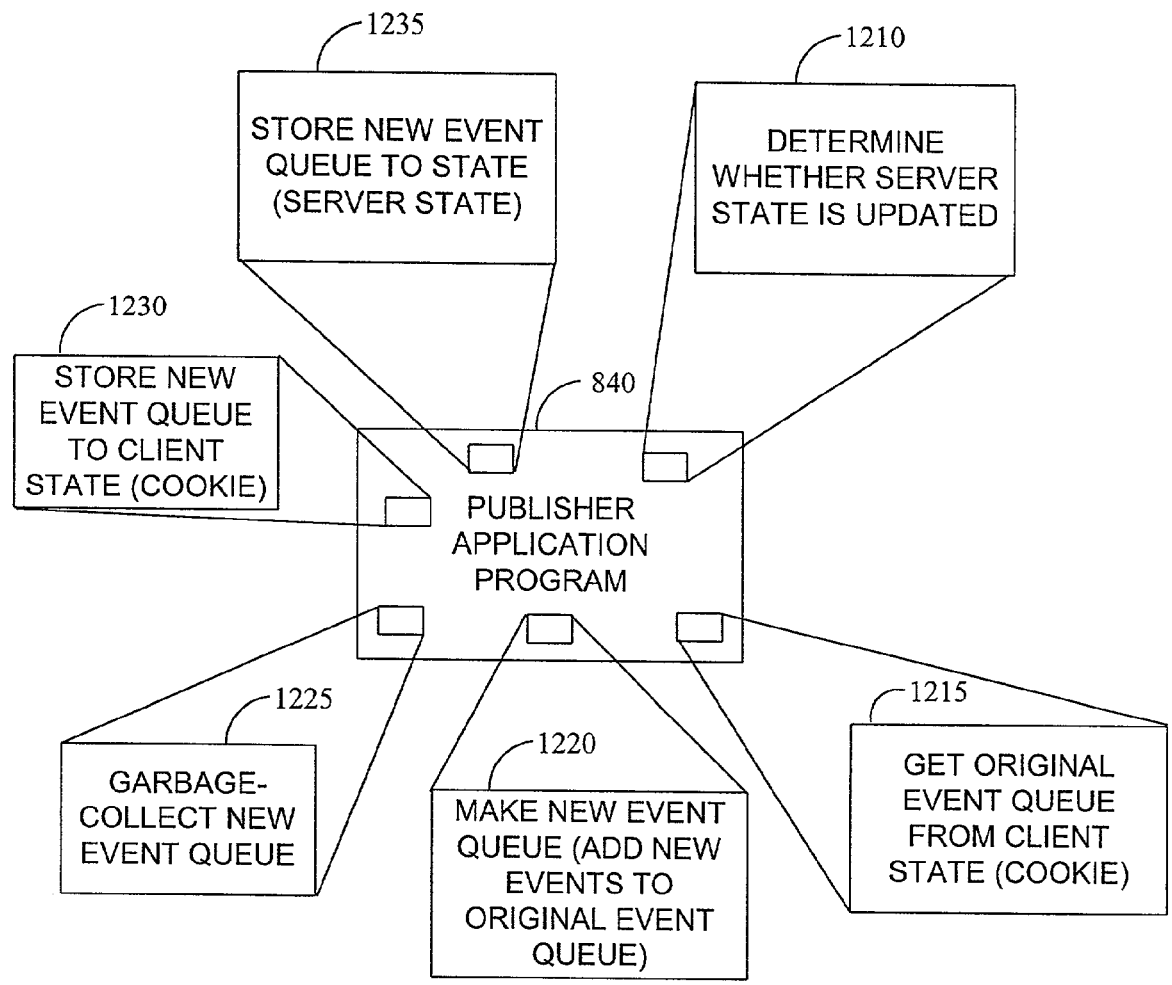
FIG. 12 is a diagram illustrating certain components of a publisher collaborating Web server, in accordance with a preferred embodiment of the invention.
Figure 13:
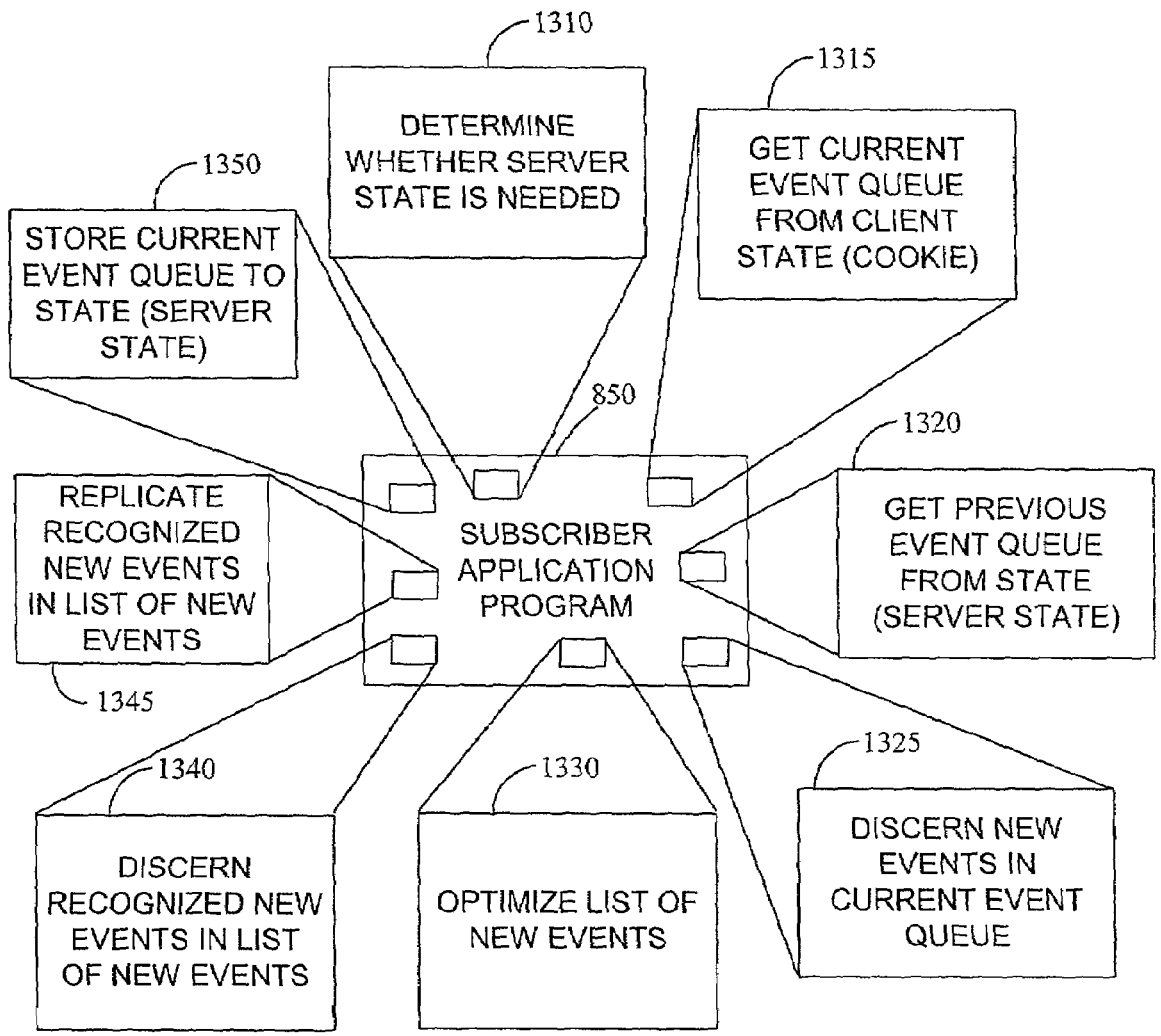
FIG. 13 is a diagram illustrating certain components of a subscriber collaborating Web server, in accordance with a preferred embodiment of the invention.

Having described the system of FIGS. 8 and 9A–9C, and the operation of the publisher application program 840 (FIG. 10) and the subscriber application program 850 (FIG. 11) according to the preferred inventive approach of the present invention, reference is now made to FIGS. 12 and 13, which illustrate certain components (e.g., program segments) of the publisher application program 840 and the subscriber application program 850 according to that approach. Again, the particular implementation of these components need not be described herein, as the implementation will be understood or appreciated by persons skilled in the art, from the discussion herein. Further, the function and operation of each of these components have been described previously herein, and need not be repeated here. It should lastly be noted that not all components of publisher application program 840 and subscriber application program 850 are illustrated in FIGS. 12 and 13. Indeed, publisher application program 840 and subscriber application program 850 should be understood to additionally be comprised of the usual components (known in the art) for receiving HTTP/HTTPS requests, processing them, and sending HTTP/HTTPS responses. The components illustrated within FIGS. 12 and 13 are, rather, those inventive components needed to extend the standard functioning of such Web server programs for maintenance of consistent server-side state across the collaboration pool, according to the preferred inventive approach of the present invention.

Referring first to FIG. 12, certain components of the publisher application program 840 are shown, according to the preferred inventive approach of the present invention. These components include the following:

Component 1210 functions to determine whether handling of the current HTTP/HTTPS request has resulted in server-side state being updated (within the independent server-side state repository of publisher server 820A).

Another component 1215 functions to get the value of the event queue, as it exists at the initiation of the current HTTP/HTTPS request. This original event queue value is obtained from its repository in client-side state (e.g., from a cookie, according to a preferred embodiment)—the same repository as referenced by components 1230 of FIGS. 12 and 1315 of FIG. 13 (each described below).

A third component 1220 functions to create new event descriptor(s), one for each of the event(s) which correspond to the server-side state update(s) determined by component 1210. Component 1220 attaches these new event descriptors to the original event queue value obtained by component 1215, resulting in a new event queue.

An additional, optional component 1225 functions to garbage-collect event descriptors in the new event queue produced by component 1220, in such a manner that event descriptors no longer needed by any subscriber server 820B within the collaboration pool are removed from the event queue, thus reducing its size.

A fifth component 1230 stores the new event queue (optionally garbage-collected by component 1225, as previously noted) to the event queue repository in client-side state (e.g., to a cookie, according to a preferred embodiment). This is the same repository as referenced by component 1215 of FIG. 12 (described above) and component 1315 of FIG. 13 (described below), and thus this component 1230 overwrites the original event queue therein.

A final component 1235 likewise stores that same event queue as component 1230 to a particular location in state (e.g., server-side state, according to a preferred embodiment)—the same location as referenced by components 1320 and 1350 of FIG. 13 (described next).

Referring now to FIG. 13, certain components of the subscriber application program 850 are shown, according to the preferred inventive approach of the present invention. These components include the following:

Component 1310 functions to determine whether handling of the current HTTP/HTTPS request will entail utilization of server-side state (within the independent server-side state repository of subscriber server 820A).

Another component 1315 functions to get the value of the event queue, as it exists at the initiation of the current HTTP/HTTPS request. This current event queue value is obtained from its repository in client-side state (e.g., from a cookie, according to a preferred embodiment)—the same repository as referenced by components 1215 and 1230 of FIG. 12 (described above).

A third component 1320 functions to get the value of the event queue, as it existed at the end of some previous HTTP/HTTPS request. This previous event queue value is obtained from a particular location in state (e.g., server-side state, according to a preferred embodiment)—the same location as referenced by component 1235 of FIG. 12 (see above) and component 1350 of FIG. 13 (described below).

Component 1325 functions to discern any event descriptor(s), new to this subscriber server 820B, which are contained within the current event queue obtained by component 1315 (e.g., by comparison with the previous event queue obtained by component 1320, according to a preferred embodiment).

An additional, optional component 1330 serves to optimize the list of new event descriptor(s) obtained by component 1325, such that any events within that list are neglected, whose replication on this subscriber server 820B would be superseded or redundant as judged by the effects of such replication on subscriber server 820B server-side state.

A sixth component 1340 functions to select only those event descriptor(s) which are recognized by, and relevant to, subscriber server 820B server-side state, from the list of new event descriptor(s) obtained by component 1325 (and optionally optimized by component 1330, as previously described).

Another component 1345 functions to replicate the effects on subscriber server 820B server-side state of each event within the list of recognized, new event descriptor(s) obtained by component 1340. Such replication may use many techniques, as previously described herein.

A final component 1350 stores the current event queue obtained by component 1315 to a particular location in state (e.g., server-side state, according to a preferred embodiment)—the same location as referenced by components 1235 of FIGS. 12 and 1320 of FIG. 13 (both described above).

The foregoing has described the operation and components of both publisher and subscriber servers in accordance with the preferred inventive approach to the present invention. Notwithstanding the complete discussion presented above, the following is a pseudo-code listing of computer programs for one embodiment of that approach. Specifically, the PUBLISHER ALGORITHM below may be executed by publisher application program 840 on publisher collaborating Web server 820A, as described above. This algorithm represents an illustrative embodiment of stages 1015–1035 of FIG. 10. In turn, the SUBSCRIBER ALGORITHM below may be executed by subscriber application program 850 on subscriber collaborating Web servers 820B, as described above. That algorithm represents an illustrative embodiment of stages 1115–1150 of FIG. 11.

Publisher Algorithm

The following algorithm is implemented as a server-side component (for example, as a library routine or class used by a server-API plugin, servlet, CGI or FastCGI program) on Publisher machines.

The algorithm is executed by the Publisher when an HTTP/HTTPS request is received from a Client which causes the Publisher to (possibly among other things) perform some kind of Event, X. The algorithm is executed immediately after the last step in performing Event X. The algorithm may be executed multiple times, if multiple Events, X and Y and . . . , are implicated in handling a single Client request. Conversely, this algorithm is bypassed for those requests which don't implicate any Events.

```
/* PUBLISHER ALGORITHM: Perform this whenever an Event has taken place. */
/* Get value of current Event Queue, if any - which is the new Event Queue
that resulted from a previous execution of this algorithm while handling
this HTTP/HTTPS request, or the value of the cookie in the HTTP/HTTPS
request if this is the first such execution. */
QueueName = The cookie name for the Event Queue
CurrentQueue = Get from QueueName cookie set previously in this request;
      or from client request
/* Make the new Event Descriptor for this Event occurrance. Note this
algorithm shows the sequence number as an explicit field; other embodiments
may maintain the Event Descriptors sorted within the Event Queue in which
case the sequence is implicit and the EventSequence attribute below is
unnecessary. */
EventType = Some indicative string for this particular Event category
      (e.g., "login" or "logout")
EventArgument = As appropriate for this EventType: blank; or one or more
      string parameters describing this particular occurrance of the Event
EventSequence = Obtain next sequence from CurrentQueue; or initialize to 1
      when there was no CurrentQueue
NewEventDescriptor = String serialization of EventType, EventArgument, and
      EventSequence
/* Make the new Event Queue out of the current Event Queue, if any, plus
the new Event Descriptor. To prevent overflow of the cookie, some
embodiments will garbage-collect old Event Descriptors in the cookie at
this point. */
IF (there is a CurrentQueue) {
    NewQueue = CurrentQueue catenated with NewEventDescriptor
}
ELSE {
    NewUniqueValue = generate clocktime or other pseudo-random number
    NewQueue = NewUniqueValue catenated with NewEventDescriptor
}
/* Set the cookie. */
QueueDomain   = The common network domain for the Collaboration Pool
QueueExpires  = The desired expiration time for the Event Queue, if any
Emit HTTP Response Header:
    "Set-Cookie: QueueName=NewQueue;Domain=QueueDomain;Expires=
    QueueExpires"
/* Remember this new Event Queue - this is so that subsequent invokations
of the Subscriber algorithm on this machine won't inadvertently self-
subscribe to Events which were published here. */
Store NewQueue to server-side state
/* Done. Return from this component and resume handling the request. If
another Event is published by calling this algorithm again later in the
request handling, that is OK - multiple Set-Cookie headers will result and
by HTTP cookie-handling convention the Client should interpret our last one
as the final one.
```

Subscriber Algorithm

The following algorithm is implemented as a server-side component on Subscriber machines.

The algorithm is executed by the Subscriber when an HTTP/HTTPS request is received from a Client which could potentially necessitate the server to read from state data dependent on any of the Events in question. The algorithm is performed before the first such read per request; subsequent reads from state in the same request do not need to execute the algorithm. In many embodiments of the present invention, these timing requirements are easily satisfied by simply executing the Subscriber algorithm at the beginning of the server's request handling block, for each client HTTP/HTTPS request which uses server-side state.

```
/* SUBSCRIBER ALGORITHM: Perform this before the first occasion where any
state data dependent on any of the Event(s) is read. */
/* Get the current Event Queue from the cookie in the client request. */
QueueName     = The cookie name for the Event Queue
CurrentQueue  = Get from QueueName cookie; blank if no such cookie
/* Get the previous Event Queue from where we would have put it into
server-side state during previous executions of the Publisher or Subscriber
algorithms on this machine. */
PreviousQueue = Fetch from server-side state; blank if not found
/* Check for the presence of any new Event Descriptors in the current Event
Queue. One way to do this is to compare the queue's values - if they are
the same, there has been no change. If they are different, there has been
a change. */
IF (CurrentQueue != PreviousQueue) {
    /* Get the new Event Descriptors from the current Event Queue, if any. If
    the two Queues' unique values are the same, the new Event Descriptors are
```

-continued

```
those present in the CurrentQueue but not the PreviousQueue. If the unique
values are different, the new Event Descriptors are simply all those
present in the CurrentQueue. */
      CurrentUniqValue = CurrentQueue.UniqValue or blank if no CurrentQueue
      PreviousUniqValue = PreviousQueue.UniqValue or blank if no PreviousQueue
      IF (CurrentUniqValue == PreviousUniqValue) {
          NewEventDescriptors = Extract all Event Descriptors in CurrentQueue
              which are not in PreviousQueue
      }
      ELSE {
          NewEventDescriptors = Extract all Event Descriptors in CurrentQueue
      }
      IF (NewEventDescriptors exist) {
/* In some embodiments, the new Event Descriptors will already be sorted;
otherwise an explicit sort at this step will be needed. */
          SORT NewEventDescriptors by their sequence numbers
/* The preferred embodiment includes some optimization heuristics, to
improve efficiency/performance. The following step is an example, but
others exist. Walk backwards through the sorted list of new Event
Descriptors, from most recent sequence number to earliest. At each step,
map from the Event type to one or more optimization heuristics, and apply
each one to the other Event Descriptors destructively. Different systems
may employ different heuristics. This illustrates some which act to cancel
all or certain Events coming earlier and/or later in the list. See the
Subscriber definition earlier in this document for some examples of
plausible heuristics for various real-world events like login and logout.
*/
          FROM NewEventDescriptors [Last] TO NewEventDescriptors [First] {
              Heuristics = Map from NewEventDescriptors [This] .EventType
              FOR EACH Heuristics {
                  IF (Heuristic == CancelAllEarlier) {
                      Delete NewEventDescriptors [First] ...
                          NewEventDescriptors [This – 1]
                  }
                  ELSE IF (Heuristic == CancelAllLater) {
                      Delete NewEventDescriptors [This + 1] ...
                          NewEventDescriptors [Last]
                  }
                  ELSE IF (Heuristic == CancelCertainEarlier) {
                      WhichEventTypes =
                          Map from NewEventDescriptors [This] .EventType
                      Delete NewEventDescriptors [I]
                          where I = (First ... This – 1) and
                          NewEventDescriptors [I] .EventType in WhichEventTypes
                  }
                  ELSE IF (Heuristic == CancelCertainLater) {
                      WhichEventTypes =
                          Map from NewEventDescriptors [This] .EventType
                      Delete NewEventDescriptors [I]
                          where I = (This + 1 ... Last) and
                          NewEventDescriptors [I] .EventType in WhichEventTypes
                  }
              }
          }
/* Do actual replication activities for each new Event Descriptor which
remains after the optimization step above. Replication activities will
vary greatly from one Event type and one embodiment to another. Do the
activities in Queue order. If a particular Event type is ignored (i.e.,
not recognized) by this Subscriber, just skip past it; only the recognized
(i.e., germane to this Subscriber) Events are replicated. */
          FROM NewEventDescriptors [First] TO NewEventDescriptors [Last] {
              IF (NewEventDescriptors [This] .EventType is recognized) {
                  Replicate NewEventDescriptors [This]
              }
          }
      }
/* Save the current Event Queue - even if non-existent - to server-side
state, to facilitate the Subscriber algorithm next time it runs on a
subsequent client HTTP/HTTPS request to this Subscriber. */
      Store NewQueue to server-side state
}
/* Done. Return from this component and resume handling the request. */
```

Various aspects of the methods illustrated herein are depicted as steps in flowcharts. It should be appreciated that these steps may be carried out in various ways and using various implementations. In one embodiment, the method steps may be implemented as program code that is executed by a processor. In other embodiments, the method steps may be implemented directly in hardware, microcode, or a combination thereof. Broadly, regardless of the specific implementation, companion system components may be viewed simply as logic for implementing the illustrated steps.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

I claim:

1. A method of replicating server-side state information among a plurality of collaborating servers connected to a network, the method comprising:
   determining at a subscriber server from information stored on a client computer whether an event has been performed on a publisher server at the request of the client computer, which event implicates a need for state change on the subscriber server; and
   if such an event has been performed, replicating state effects of the event into state on the subscriber server.

2. The method of claim 1, wherein the step of determining at a subscriber server from information stored on a client computer whether an event has been performed on a publisher server further comprises:
   receiving an event queue stored on the client computer to the subscriber server;
   determining whether any events recorded in the event queue are not yet replicated on the subscriber server; and
   determining whether any such events require replication on the subscriber server.

3. The method of claim 2, wherein the step of determining whether any events in the event queue are not yet replicated on the subscriber server further comprises comparing the event queue retrieved from the client computer with a most-recently-experienced event queue recorded by the subscriber server.

4. The method of claim 3, wherein the event queue retrieved from the client computer is recorded as the most-recently-experienced event queue by the subscriber server following the comparison.

5. The method of claim 2, wherein the step of determining whether any unreplicated events in the event queue require replication on the subscriber server further comprises:
   determining what state on the subscriber server is relevant to the subscriber server at the time; and
   determining if replicating such an event would effect change to such server-side state.

6. The method of claim 2, wherein the step of determining whether any unreplicated events in the event queue require replication on the subscriber server further comprises determining if undertaking replication of one such event can be skipped by the subscriber server due to the existence of another such event whose replication by the subscriber server would suffice for the first.

7. The method of claim 1, wherein the step of replicating the state effects of an event into state on the subscriber server further comprises copying state data from the event queue into subscriber server state.

8. The method of claim 1, wherein the step of replicating the state effects of an event into state on the subscriber server further comprises copying state data from another server computer into subscriber server state.

9. The method of claim 8, wherein the state data is copied by the subscriber server over the network from the publisher server.

10. The method of claim 8, wherein the state data is copied by the subscriber server over the network from a database server.

11. The method of claim 8, wherein the state data copied by the subscriber server over the network from another server is converted from a first data format into a second data format.

12. The method of claim 1, further comprising:
    performing an event on a publisher server at the request of the client computer, which causes state change on the publisher server;
    retrieving an event queue stored on the client computer to the publisher server;
    adding a new event descriptor characterizing the event to the event queue; and
    sending the event queue from the publisher server to be stored on the client computer.

13. The method of claim 12, wherein the event queue is stored on the client computer within a transport mechanism of a cookie.

14. The method of claim 12, wherein the event queue includes:
    one or more event descriptors;
    a uniqueness provision; and
    a specified duration.

15. The method of claim 12, wherein each event descriptor includes:
    a characterization of the general type of event;
    zero or more arguments characterizing the specific instance of the event;
    a discernible ordinal position within an event queue.

16. The method of claim 14, wherein the uniqueness provision is a unique value in the form of a timestamp.

17. The method of claim 14, wherein the uniqueness provision is a unique value in the form of a pseudorandom datum.

18. The method of claim 12, wherein the step of retrieving an event queue stored on a client computer to a publisher server further comprises allocating an initial event queue if no event queue is yielded by the retrieval.

19. The method of claim 12, wherein the step of adding a new event descriptor characterizing an event to an event queue further comprises adding the event descriptor such that it is ordinally maximal within the event queue.

20. The method of claim 12, wherein the step of adding a new event descriptor characterizing an event to an event queue further comprises removing those event descriptors from the event queue which are no longer needed by any collaborating server.

21. The method of claim 12, wherein the event queue sent to the client computer is recorded as the most-recently-experienced event queue by the publisher server.

22. A system for replicating server-side state information among a plurality of collaborating servers connected to a network, the system comprising:
    logic configured to determine at a subscriber server from information stored on a client computer whether an event has been performed on a publisher server at the request of the client computer, which event implicates a need for state change on the subscriber server; and
    logic configured to replicate state effects of the event into state on the subscriber server, if such an event has been performed.

23. The system of claim 22, wherein the logic configured to determine further comprises:
- logic configured to retrieve an event queue stored on the client computer to the subscriber server;
- logic configured to determine whether any events recorded in the event queue are not yet replicated on the subscriber server; and
- logic configured to determine whether any such events require replication on the subscriber server.

24. The system of claim 23, wherein the logic configured to determine whether any unreplicated events in the event queue require replication on the subscriber server further comprises:
- logic configured to determine what state on the subscriber server is relevant to the subscriber server at the time; and
- logic configured to determine if replicating such an event would effect change to such state.

25. The system of claim 22, further comprising:
- logic configured to perform an event on a publisher server at the request of the client computer, which causes state change on the publisher server;
- logic configured to retrieve an event queue stored on a client computer to the publisher server;
- logic configured to add a new event descriptor characterizing the event to the event queue; and
- logic configured to send the event queue from the publisher server to be stored on the client computer.

* * * * *